United States Patent
Regunathan et al.

(10) Patent No.: US 11,737,041 B2
(45) Date of Patent: *Aug. 22, 2023

(54) MULTIMODAL INROUTE TIMING SYNCHRONIZATION SYSTEM

(71) Applicant: Hughes Network Systems, Germantown, MD (US)

(72) Inventors: Murali Regunathan, Washington, DC (US); Zheng Wu, Germantown, MD (US); John Border, Middleton, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,800

(22) Filed: Sep. 9, 2022

(65) Prior Publication Data

US 2023/0083699 A1    Mar. 16, 2023

Related U.S. Application Data

(63) Continuation of application No. 17/398,126, filed on Aug. 10, 2021, now Pat. No. 11,490,347.

(Continued)

(51) Int. Cl.
*H04W 56/00* (2009.01)
*H04B 7/185* (2006.01)
*H04W 88/16* (2009.01)

(52) U.S. Cl.
CPC .... *H04W 56/0045* (2013.01); *H04B 7/18528* (2013.01); *H04W 56/006* (2013.01); *H04W 88/16* (2013.01)

(58) Field of Classification Search
CPC .......... H04W 56/0045; H04W 56/006; H04W 88/16; H04B 7/18528
See application file for complete search history.

(56) References Cited

U.S. PATENT DOCUMENTS 6,215,780 B1    4/2001    Peters et al.
2013/0315136 A1    11/2013    Bhaskar et al.
(Continued)

OTHER PUBLICATIONS

International search report for PCT application No. PCT/US2022/014621.

*Primary Examiner* — Ashley Shivers
(74) *Attorney, Agent, or Firm* — Capitol City TechLaw; Jasbir Singh

(57) ABSTRACT

A method and system for determining inroute frame timing for a Very Small Aperture Terminal (VSAT) includes receiving an appointment to transmit, on an inroute, at a start of a slot X of a frame number M; establishing, at a VSAT, an arrival time of a super frame numbering packet (SFNP) including a satellite ephemeris vector and a frame number N; calculating, at the VSAT, a timing offset ($T_{RO}$) to be applied to the arrival time to compensate for a time varying gateway-satellite-terminal propagation delay ($T_{HS}+T_{SR}$); setting a transmit instant as an end of the $T_{RO}$ after the arrival time; adding to the transmit instant a duration of X slots and a duration of (M-N) frames; and transmitting a burst, on the inroute from the VSAT, at the transmit instant. In the method, the calculating is based on computing $T_{HS}+T_{SR}$ from the satellite ephemeris vector, a gateway transmits the SFNP and receives the burst in the slot X within the frame number M of the inroute, and N is greater than or equal to M. A method and system for using ephemeris data for inroute timing is disclosed.

20 Claims, 8 Drawing Sheets

Related U.S. Application Data

(60) Provisional application No. 63/145,312, filed on Feb. 3, 2021.

(56) References Cited

U.S. PATENT DOCUMENTS

2015/0270890 A1    9/2015   Vasavada et al.
2019/0342847 A1*  11/2019   Tee ..................... H04W 72/30

* cited by examiner

| Primary GW 610 | OutRoute Tx and Inroute Rx 614 | OutRoute Tx and No Inroute Rx 616 | | No Tx/Rx 618 |
|---|---|---|---|---|
| Backup GW 620 | Configuration 622 | OutRoute Tx and No Inroute Rx 624 | | OutRoute Tx and Inroute Rx 628 |
| SCF/ Satellite 630 | Send Switch to Satellite 632 | FWD Switch 634 | RTN Switch 636 | Switch ACK 638 |
| Terminal RX 640 | Outroute from Primary 642 | Lose Outroute 644 | FLL OR/IR Lock 646 | Traffic from Backup GW 648 |
| Terminal TX 650 | Inroute Tx to Primary GW using PGW-Delay 652 | | Inroute Tx to Backup GW using BGW-Delay 654 | |
| CRO/IGM SNC 660 | Send RSFNP and Freeze BW 662 | | Unfreeze BW Allocation 664 | Stop RSFNP and send SFNP 666 |

Switch Start 602                606                 Switch End 604
                                        ↖ 600

FIG. 6

MULTIMODAL INROUTE TIMING SYNCHRONIZATION SYSTEM

CROSS-REFERENCE TO RELATED APPLICATIONS AND INCORPORATION BY REFERENCE

The present application is a continuation of U.S. Pat. No. 11,490,347 issuing from U.S. application Ser. No. 17/398,126, filed Aug. 10, 2022, claims the benefit under 35 U.S.C. 119(e) of U.S. Provisional Application Ser. No. 63/145,312, filed Feb. 3, 2021, which is incorporated herein by reference in its entirety.

FIELD

A multimodal approach to achieve improved efficiency and resiliency for In-Route (IR) Timing synchronization. Ephemeris based timing (EBT) uses the satellite ephemeris data to achieve inroute timing synchronization. When the ephemeris data is not available, the system transitions via a Temporary Outage Mode (TOM) and a Short-Term Outage Mode (STOM) to an EBT-CLT mode where the satellite location is assumed fixed at the center of box. The aperture size for each of these modes may be the same. In the EBT-CLT mode, gateway feedback to a terminal helps keep the timing synchronization. Prediction of $T_{RO}$ at the terminal may reduce the number of CLT messages required by up to 75%.

BACKGROUND

Each gateway and its terminals are interconnected in a star topology with the gateway at the center of the star and the terminals at the points of the star. Each gateway broadcasts multiple outroute carriers to each of its beams. The terminals use TDMA to access shared inroute channels for transmissions through the satellite to the gateway. For the purposes of inroute timing synchronization, each gateway-beam pair can be treated as an isolated and independent TDMA network, which manages its inroute timing synchronization independently of the other gateways and beams.

An ephemeris file is periodically distributed by the Satellite control facility to the network components. The gateways interpolate the coarse data to achieve a finer resolution before sending the current satellite location to the terminals via the SFNP message. The terminals use their own location, the GW location and the satellite location to achieve timing synchronization.

TDMA requires that each terminal transmit its data bursts to the satellite for relay to the gateway such that the bursts start within a narrow window of time, the aperture, at the gateway. For different terminal locations within a beam, the propagation time from a terminal to the gateway through the satellite can vary by several milliseconds (ms). Further, due to the satellite movement in its orbit and/or movement of the terminal, the propagation time between the terminal and the gateway via the satellite varies continuously. These variations differ for different terminal locations. These variations require that each gateway and terminal execute procedures to determine exactly when the terminal should transmit a data burst, so that it will arrive at the gateway at the assigned times (i.e., within the aperture).

The inroute time axis is divided into units of superframes, frames and slots. An exemplary Superframe duration (TSF) is 360 ms and an exemplary frame duration (TFRM) is 45 ms for frames in the Superframe. The frame duration is such that a superframe will contain an integer number (M) of frames. Each frame contains an integer number of slots (NSL), and each slot contains an integer number of symbols (NSYM). FIG. 1 illustrates a timing relationship between a gateway and a terminal. A vertical line on the figure shows what is happening at the gateway (at the top) and at the terminal (at the bottom) at the same time. On the inroute, the horizontal (time) axis is marked in units equal to the length of an inroute frame. Terminals access the inroute by transmitting in bursts, each of which occupies multiple slots. A unique word (UW) is placed at the start of the burst in order to allow burst detection at the gateway. In some embodiments, a burst can be detected when at least a last symbol of the UW arrives within the aperture. In other embodiments, the UW need not arrive within the aperture,

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose an efficient and resilient system to determine the timing offset TRO to compensate for time varying gateway-satellite-terminal propagation delay.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for determining inroute frame timing for a Very Small Aperture Terminal (VSAT). The method includes receiving an appointment to transmit, on an inroute, at a start of a slot X of a frame number M; establishing, at a VSAT, an arrival time of a super frame numbering packet (SFNP) including a satellite ephemeris vector and a frame number N; calculating, at the VSAT, a timing offset (TRO) to be applied to the arrival time to compensate for a time varying gateway-satellite-terminal propagation delay (THS+TSR); setting a transmit instant as an end of the TRO after the arrival time; adding to the transmit instant a duration of X slots and a duration of (M-N) frames; and transmitting a burst, on the inroute from the VSAT, at the transmit instant. In the method, the calculating is based on computing THS+TSR from the satellite ephemeris vector, a gateway transmits the SFNP and receives the burst in the slot X within the frame number M of the inroute, and N is greater than or equal to M. Other embodiments of this aspect include corresponding computer systems, apparatus, and computer programs recorded on one or more computer storage devices, each configured to perform the actions of the methods.

Implementations may include one or more of the following features. The method where the transmit instant has an aperture size of 15 microseconds or less. The method may include determining a TRO reference (TRO-ref) by requesting timing information from the gateway via an asynchronous burst, where the TRO-ref is used for the calculating. The method may include determining an estimated TRO (TRO-est) via a ranging ALOHA session, where the TRO-est is used for the calculating. The method where the calculating updates the TRO based on a new satellite coordinate in a new SFNP. The method where the calculating is based on a timing feedback include an inroute burst timing offset. The method may include requesting a timing feedback when the VSAT has been idle for longer than a timer threshold or when the SFNP indicates that the gateway requests a timing reacquisition. The method where the satellite ephemeris vector includes an estimated center-of-box vector for a satellite location. The method may include predicting, a next inroute burst timing offset, based on previous timing feedbacks. The method where the appointment is received by the VSAT via a bandwidth allocation packet. Implementations of the described techniques may include hardware, a method or process, or computer software on a computer-accessible medium.

One general aspect includes a method for using ephemeris data for inroute timing. The method includes receiving ephemeris prediction data may include ephemeris vectors over a usable period; validating the ephemeris prediction data; calculating satellite-to-gateway delays for transmitting RF to the ephemeris vectors; and sending, to a VSAT, a SFNP including one of the ephemeris vectors and an associated satellite-to-gateway delay. Other embodiments of this aspect include corresponding computer systems, apparatus, and computer programs recorded on one or more computer storage devices, each configured to perform the actions of the methods.

Implementations may include one or more of the following features. The method may include interpolating the ephemeris prediction data over the usable period to obtain ephemeris vectors at a fine resolution, where the calculating calculates the satellite-to-gateway delays for the ephemeris vectors at the fine resolution, the ephemeris prediction data is at a gross resolution, and the fine resolution has a smaller duration than the gross resolution. The interpolating may include linear interpolation using two adjacent in time datapoints from the ephemeris prediction data. The interpolating may include smoothing the ephemeris vectors at the fine resolution when a round-trip time difference between two adjacent in time datapoints in the ephemeris prediction data exceeds a threshold. The validating may include a time-interval validation. The validating may include a data validation. The validating may include a file transition validation. The validating may include smoothing a transition, using a weighted average, from the ephemeris predication data to a previous ephemeris predication data. The method may include determining the ephemeris vectors and associated satellite-to-gateway delays based on a center-of-box location of a satellite when the validating indicates a failure in the ephemeris predication data. The method may include acquiring valid ephemeris prediction data; and smoothing a transition, using a weighted average, from using the ephemeris vectors based on the determining to valid vectors calculated based on the valid ephemeris predication data. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 6 illustrates a timeline of a switch from a primary GW to a backup GW according to various embodiments.

Figure 1:
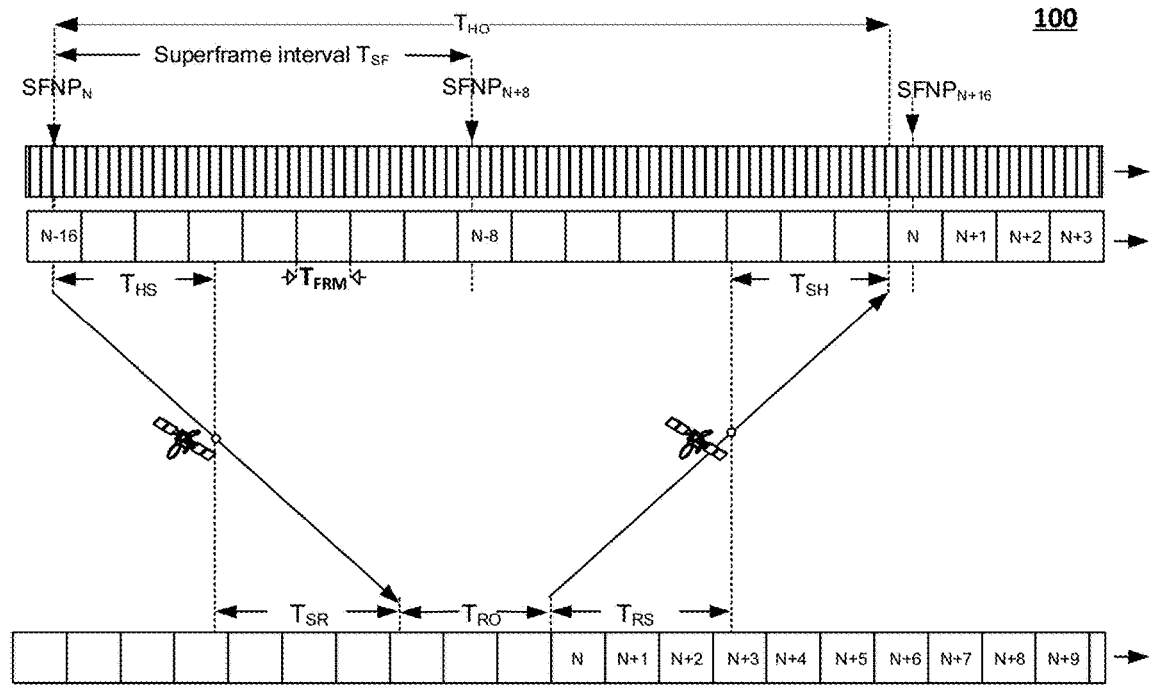
FIG. 1 illustrates a system timing relationship between a gateway and terminal according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present teachings disclose a multimodal approach to achieve improved efficiency and resiliency for Timing synchronization. The teachings use Ephemeris Based Timing (EBT) when ephemeris data is available. When ephemeris data is unavailable, the system may transition between one or more of a Temporary Outage Mode (TOM), a Short-term outage mode (STOM) and an Ephemeris Based Timing-Closed Loop Timing (EBT-CLT) mode. When ephemeris data becomes available while in TOM, STOM or EBT-CLT mode, the system may begin transitioning back to the EBT mode. In EBT-CLT mode, the satellite location is assumed fixed at the center of a box. In the EBT-CLT mode, a GW feedback to individual terminal helps keep the timing synchronization. Prediction of TRO at the terminal helps reduce the number of CLT messages required by up to 75%.

A receive window at the GW or aperture size is an overhead that is incurred for every burst transmission. An aperture window for current systems is dependent on various parameters including satellite station keeping parameters, satellite motion, spot beam sizes and spot beam location with respect to the satellite orbital longitude. Due to the wide range of these system parameters across systems, the aperture can have wide ranging values and may be calculated for a gateway and the terminals served by the gateway.

The present teachings reduce dependence on system parameters to provide timing synchronization. In some embodiments, individualized timing synchronization between each grouping of a GW, a satellite and a terminal may be provided. The present teachings reduce aperture sizes and operate with a higher efficiency than the prior art. With the prior art (a steady state method), the aperture size ranges from 25-55 microseconds (μs). With the present teachings, system aperture sizes may be reduced to 10 μs, provide a reduction in the overhead and increase inroute efficiency. In some embodiments, the aperture size for EBT, TOM, STOM and EBT-CLT modes may be the same.

In some embodiments, an initial timing acquisition may be using a bootstrap ALOHA. In some embodiments, the bootstrap ALOHA may be replaced by Asynchronous Scrambled Coded Multiple Access (ASCMA) for initial timing acquisition. Aperture sizes for bootstrap ALOHA can range from 400 μs to 1 ms and beyond. At such high aperture sizes, provisioning multiple ALOHA channels are inefficient. ASCMA unlike slotted ALOHA can be detected any time without a specific arrival window. In the present teaching, even without ASCMA, the aperture size for BOOTSTRAP is reduced while increasing system resiliency. The presence of multiple modes, transitioning modes and multi-level ephemeris file handling provides high resiliency.

FIG. 1 illustrates a system timing relationship between a gateway and terminal according to various embodiments.

FIG. 1 illustrates a system timing relationship 100 between a gateway and a terminal. In order to time its bursts correctly, the terminals must (1) establish a time reference that is tightly synchronized to the gateway's time reference and (2) take into account time varying propagation delays. For example, the standard DVB-S2 outroute does not have any time marker that a terminal can use to synchronize its time reference with the gateway's time reference. In some systems, each gateway broadcasts on the outroute a timing reference, in the form of superframe numbering packet (SFNP), to all terminals in the beam. An SFNP may be transmitted by the gateway on the outroute, for example, once every TSF. Timing references may use the following nomenclature.

$T_{HS}$: propagation time from gateway to satellite
$T_{SR}$: propagation time from satellite to terminal
$T_{RO}$: terminal offset time (Time between "ideal" receipt of $SFNP_N$ at a terminal and the transmit time for the start of transmission for frame N at this terminal)
$T_{RS}$: propagation time from terminal to satellite
$T_{SH}$: propagation time from satellite to gateway
$SFNP_N$: Superframe numbering packet that marks frame N
$T_{SRS}$: satellite-to-terminal-to-satellite round-trip time or $T_{SR}+T_{RS}$
$T_{HO}$: gateway offset time (time interval between the ideal instant of transmission of $SFNP_N$ at the gateway and the start of reception of frame N at the gateway); $T_{HO}=T_{HS}+T_{SR}+T_{RO}+T_{RS}+T_{SH}$
$T_{HSH}$: The gateway-to-satellite round-trip time or $T_{HS}+T_{SH}$; $T_{HO}$ may alternatively be calculated as $T_{HO}=T_{HSH}+T_{SR}+T_{RO}+T_{RS}$
$T_{RO}$: The terminal offset time maybe calculated as $T_{RO}=T_{HO}-T_{HSH}-T_{SRS}$ In FIG. 1, a gateway (not shown) starts an inroute TDMA frame N one time interval, THO, after it transmits the SFNPN. THO must be set large enough that an SFNP can be received by a terminal that is farthest from a satellite, do some processing at the terminal (for example, two frames worth), transmit a data burst in time to be received back at the gateway at the start of the frame number given in the SFNP packet. If THO satisfies this condition, it means that a terminal can receive a bandwidth allocation packet (BAP) and have sufficient time to process it and transmit a burst on the bandwidth allocated in the BAP. As an example, given a frame size of 45 msec and a superframe of 8 frames (360 msec) and a maximum remote-satellite-gateway propagation delay of 270 msec, the value of THO must be larger than 270+270+2*45=630 msec. If a terminal transmits at the end of its TRO interval after receiving SFNPN, the gateway receives the burst in the first slot within frame N. If the terminal needs to transmit at a later slot in the frame N (or in a slot in frames N+1–N+M−1), it adds the time delay for this slot (and this frame) to the end of the TRO interval to determine the time of transmission.

With a system using SFNP, establishing the inroute frame timing at the terminal includes:
   determination of the superframe time marker based on the time of arrival of the SFNP, and
   determination of the timing offset $T_{RO}$ to be applied to this time to compensate for time varying gateway-satellite-terminal propagation delay.

Ephemeris Based Synchronization

In the present teachings, an ephemeris file including satellite location prediction is received from a SCF and distributed to each of the gateways periodically. The satellite location information in the ephemeris may be interpolated in time to a desired resolution (for example, 1 second) and the instantaneous satellite location is broadcast to all terminals, for example, via the SFNP. The SFNP may include a GW to satellite delay. A terminal may calculate its own timing based on the satellite location, the terminal's location and the GW to satellite delay.

Figure 2:
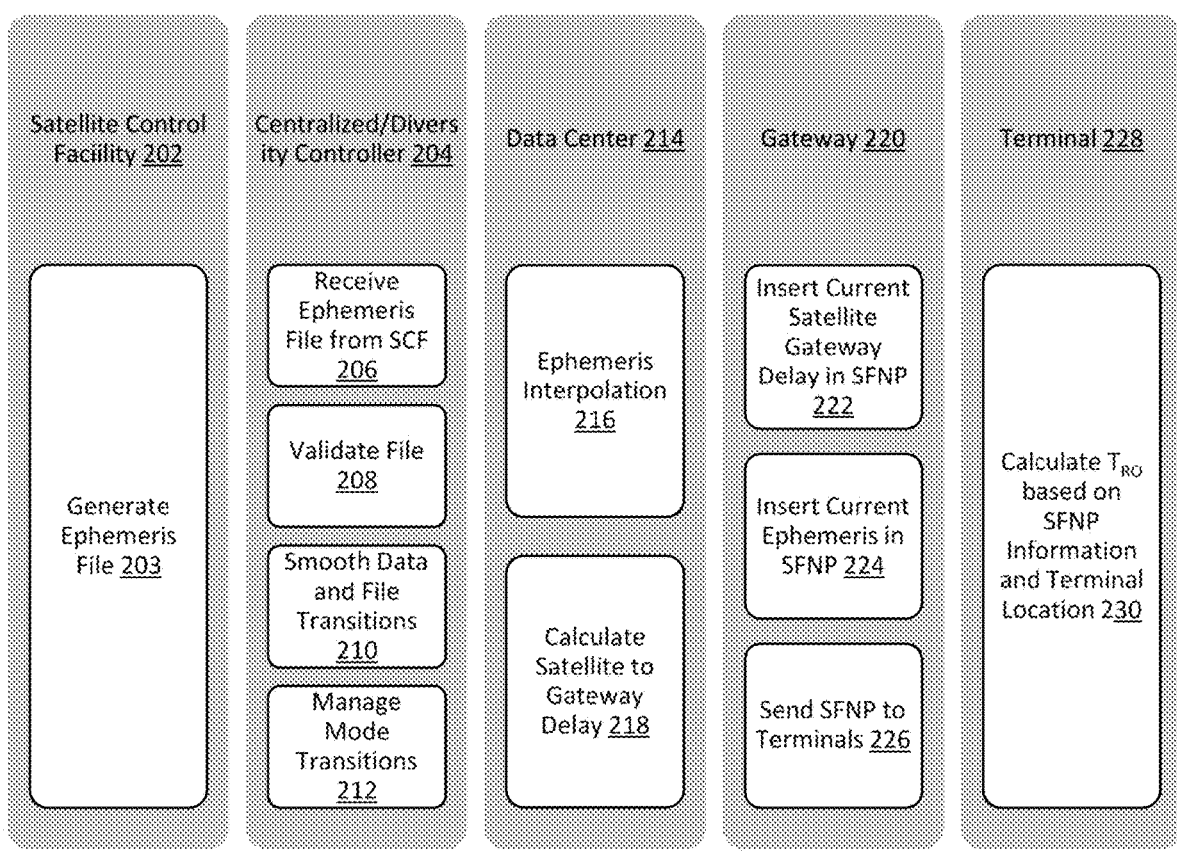
FIG. 2 illustrates an ephemeris data handling and distribution system according to various embodiments.

FIG. 2 illustrates an ephemeris data handling and distribution system according to various embodiments.

An ephemeris data handling and distribution system 200 may include a Satellite Control Facility (SCF) 202, a Centralized Controller 204, a data center 214, a gateway 220 and a terminal 228. The system 200 provides generation and distribution of ephemeris file from SCF to each GW and the terminals. The SCF 202 may generate an ephemeris file at 203. The ephemeris file may be made available periodically for a desired duration, for example, every 24 hours for the next 3 days. The centralized controller 204 may receive, at 206, the ephemeris file including satellite positions, from the SCF 202 at a resolution of, for example, 1 minute, 5 minutes, 10 minutes, 30 minutes or the like. The centralized controller 204 may validate the file and send it to a data center 214 of a Satellite Network Core (SNC). The data center 214 may interpolate, at 216, the ephemeris data to a finer resolution, for example, 1 s, 5 s, 10 s, 60 s or the like. For each resolution instant, the data center may calculate, at 218, a satellite to GW delay. The ephemeris file and the satellite gateway delay may be provided to the associated Gateway 220. The gateway 220 may compose an SFNP by inserting a current satellite location based on the ephemeris file and a current satellite GW delay, at 222 and 224, respectively. The gateway 220 may send at 226 the composed SFNP to the terminal 228, for example, via SFNP messages. The terminal 228 may calculate its current $T_{RO}$ based on SFNP information and Terminal Location. The centralized controller 204 may be a diversity controller for gateways.

Ephemeris File Handling

To manage errors in prediction and ephemeris generation, extensive file validation may be done at 208 by the Centralized Controller 204. This validation may include an absolute time check, an absolute satellite position checks, and a check to ensure there are no sudden jumps in a satellite position within a file and between two files. To counter jumps that are not manageable by the system timing, the Centralized Controller 204 may smooth data and file transitions at 210, for example, with one or more smoothing filters. The centralized controller 204 may manage mode transitions 212 among different modes for timing synchronization between the terminals and a gateway.

Inroute Synchronization Using Ephemeris-Based Timing (EBT)

The present teachings disclose a closed loop timing (CLT) to prevent a terminal from losing synchronization. For any stream traffic, if burst arrival time exceeds a certain threshold $T_d$, the GW may send a CLT correction message to that terminal. Any error between the ephemeris file and satellite motion, or errors in the location of a mobile terminal may be adjusted by the CLT. The initial timing synchronization may be established via ASCMA or Ranging Aloha.

With the present teachings inroute bursts arrive at gateway with a more accurate $T_{RO}$ calculation as compared to the prior art, it is less likely to have timing errors exceeding a CLT threshold. Thus, up to around 90% less CLT feedback traffic is needed on outroute compared with the prior art CLT-only method while aperture size can be maintained equivalent (10 µs), or even better than the CLT-only method. Furthermore, when a terminal goes IDLE for a long period of time and does not receive a CLT message, the presently disclosed teachings can re-achieve synchronization based on the latest ephemeris data from the gateway. The variation of the ephemeris prediction error with time may determine how long the terminal can stay IDLE and still achieve synchronization using the current ephemeris.

Initial Calculation of $T_{RO}$ Via Asynchronous Inroute Timing Request

An idle or newly installed terminal may send an Asynchronous Timing Request on an inroute requesting timing information. The asynchronous timing request may be sent via an Asynchronous Scrambled Coded Multiple Access (ASCMA) burst. The gateway may receive the ASCMA burst and send the absolute timing of the burst arrival back to the terminal. The terminal may use this information to adjust the timing. A successful ASCMA timing request gives the terminal a $T_{RO}$ reference value, denoted as $T_{RO\text{-}ref}$. The terminal uses this value for the timing of the very first few bursts until any timing correction or ephemris data update happens.

Initial Calculation of $T_{RO}$ without Asynchronous Inroute Communication

When ASCMA is not supported, a newly installed terminal or idle terminal may use ranging ALOHA bursts to establish its initial timing. This requires superframe synchronization, computation of $T_{HSH\text{-}NOM}$ and $T_{SRS\text{-}NOM}$ on the terminal side. The terminal may obtain its $T_{RO\text{-}est}$ for timing after a successful ranging session.

ASCMA establishes initial timing for a terminal (From step 1 to step 4). When ASCMA is not available, $T_{RO\text{-}est}$ may be determined via a ranging ALOHA session. A terminal may initialize $T_{RO\text{-}eph}$ and $T_{RO\text{-}offset}$ as follows:

1. From the most recent SFNP, the terminal receives ephemeris information in terms of satellite xyz coordinates, denoted by $x_S$, $y_S$, $z_S$. With this information, a $T_{HSR\text{-}eph}$ may be calculated as:

$$T_{HSR-eph} = \frac{1}{c} * \left(\sqrt{(x_R - x_S)^2 + (y_R - y_S)^2 + (z_R - z_S)^2} + \sqrt{(x_H - x_S)^2 + (y_H - y_S)^2 + (z_H - z_S)^2}\right)$$

Where $x_R$, $y_R$, $z_R$ refer to terminal x, y and z coordinates in ECEF coordinate system. $x_H$, $y_H$, $z_H$ are gateway coordinates, c is the speed of light in vacuum.

2. $T_{RO\text{-}eph}$ may be calculated as $T_{RO\text{-}eph} = T_{HO} - 2*T_{HSR\text{-}eph}$. With the knowledge of $T_{RO\text{-}est}$ through ranging ALOHA, $T_{RO\text{-}offset} = T_{RO\text{-}est} - T_{RO\text{-}eph}$

Ephemeris Based Timing for Stream Traffic

For continuous stream traffic, a terminal may calculate $T_{RO}$ based on the latest ephemeris data. The terminal may add the originally calculated $T_{RO}$ offset to calculate the $T_{RO\text{-}est}$. A gateway may keep monitoring an inroute burst timing offset and if it exceeds threshold $T_d$, a timing correction message may be generated and sent to the terminal. With the knowledge of ephemeris data from the SFNP, a terminal may calculate $T_{RO\text{-}est}$ more accurately. Thus, less timing correction feedbacks are generated. As such, an outroute BW usage is reduced by the present teachings when compared to the CLT synchronization of the prior art.

The process of a terminal using EBT method for timing is described as follows.

1. A new or idle terminal (not transmitted for at least $T_{IDLE}$ secs), may transmit an ASCMA burst at a time instant, $t_0$. The gateway may receive this ASCMA burst on and inroute, at time $t_1$. The gateway may send the value of $t_1$ back to that terminal.

2. Meanwhile, the terminal may estimate $T_{HSR}$ based on ephemeris data from the latest SFNP, this estimated value is denoted as $T_{HSR\text{-}eph}$. Furthermore, $T_{RO\text{-}eph}$ may be calculated for later use. The calculation of $T_{HSR\text{-}eph}$ and $T_{RO\text{-}eph}$ may be expressed as:

$$T_{HSR-eph} = \frac{1}{c} * \left(\sqrt{(x_R - x_S)^2 + (y_R - y_S)^2 + (z_R - z_S)^2}\right) + \frac{T_{HSH}}{2}$$

$$T_{RO-eph} = T_{HO} - 2 * T_{HSR-eph}$$

Where $x_R$, $y_R$, $z_R$ refer to terminal x, y and z coordinates in and ECEF coordinate system. $x_S$, $y_S$, $z_S$ are satellite x, y and z coordinates from the SFNP broadcast; $x_H$, $y_H$, $z_H$ are gateway coordinates; and c is the speed of light in vacuum.

3. Based on $T_{HSR\text{-}eph}$ and $t_1$ on the terminal side, the expected burst arrival instant at GW, denoted by $t^*_1$, may be calculated by terminal. $T_{HSR}$ offset (denoted as $T_{HSR\text{-}offset}$) may be initially calculated as a delta between expected burst arrival time $t^*_1$ and actual burst arrival time $t_1$.

$T_{HSR\text{-}offset}$ may be positive or negative, and derived from the timing feedback for the ASCMA burst.

$$t^*_1 = t_0 + T_{HSR\text{-}eph}$$

$$T_{HSR\text{-}offset} = t_1 - t^*_1$$

4. For a successful ASCMA session (Step 1) the gateway may respond to a terminal with a bandwidth allocation packet (BAP), and terminal may transmit that allocated band. Terminal may combine $T_{HSR\text{-}eph}$ from Step 2, and $T_{HSR\text{-}offset}$ from Step 3 for estimating $T_{HSR}$ as $T_{HSR\text{-}est} = T_{HSR\text{-}eph} + T_{HSR\text{-}offset}$. A $T_{RO\text{-}est}$ and $T_{RO\text{-}offset}$ may then be calculated as:

$$T_{RO\text{-}est} = T_{HO} - T_{HSR\text{-}est} * 2$$

$$T_{RO\text{-}offset} = T_{RO\text{-}est} - T_{RO\text{-}eph} = 2 * T_{HSR\text{-}offset}$$

Here $T_{RO\text{-}est}$ is the estimated $T_{RO}$ a terminal uses for actual inroute burst timing. From here, timing synchronization is established for this terminal. The terminal may save the values of $T_{RO\text{-}eph}$ and $T_{RO\text{-}offset}$.

5. For the stream inroute bursts, $T_{RO\text{-}est}$ may be used for determination of transmission time. From here, the terminal either:
   a. Keeps transmitting inroute stream bursts with current $T_{RO\text{-}est}$ until one or more of steps 5b, 5c, or 5d happens. Meanwhile, GW may keep doing Step 7 below.
   b. Receives a new SFNP. Go to Step 6.
   c. Receives a timing correction message from GW. Go to Step 9.
   d. Stops transmitting for a period longer than $T_{IDLE}$. Go to Step 1.

6. Whenever a new SFNP is broadcast, the terminal updates the $T_{RO\text{-}eph}$, based on the new $x_S$, $y_S$, $z_S$ in the SFNP prior to going to Step 10:

$$T_{HSR-eph} = \frac{1}{c} * \left( \sqrt{(x_R - x_S)^2 + (y_R - y_S)^2 + (z_R - z_S)^2} \right) + \frac{T_{HSH}}{2}$$

$$T_{RO-eph} = T_{HO} - 2 * T_{HSR-eph}$$

7. The Gateway may monitor timing errors of bursts from all terminals. The GW either: has a CLT feedback pending to be sent for a CLT timeout period ($CLT_{timeout}$) and goes to Step 8; or receives the burst with error within the threshold $T_d$ and returns to Step 5; or generates and queues for sending a timing correction message when the burst timing error exceeds threshold $T_d$. The timing correction may be an integer or a multiple-of-0.5 value that indicates the number of symbols that burst is off from center of aperture and goes to step 8. This timing correction may be referred to as $n_{offset}$.

8. When a threshold number of correction messages (nCLT) from different terminals are accumulated and/or a threshold time period ($CLT_{timeout}$) has elapsed since the correction message was generated, the GW may send a timing correction packet to this group of terminals and go to Step 9. Otherwise, the gateway may return to Step 5.

9. Upon receiving the timing correction message, the terminal may recalculate $T_{RO\text{-}offset}$:

$$T_{RO\text{-}offset}(\text{new}) = T_{RO\text{-}offset}(\text{Old}) + n_{offset} * T_s$$

Where $T_S$ is a symbol time based on the symbol rate used for the inroute burst and go to Step 10. If a CLT is received alongside a new ephemeris message, the CLT correction may be applied first.

10. With an updated value of $T_{RO\text{-}offset}$ or $T_{RO\text{-}eph}$, the terminal calculates its $T_{RO\text{-}est}$ as:

$$T_{RO\text{-}est} = T_{RO\text{-}eph} + T_{RO\text{-}offset}$$

In exemplary embodiments, the SFNP arrives every 360 ms and a new value of a satellite location appears every 1 s, it is not necessary for the terminal to apply this correction every time there is a new SFNP or new offset value. For example, when the new $T_{RO\text{-}est}$ is less than 0.5 μs different from the previous one, the terminal may skip the correction. This reduces the number of corrections applied by the terminal.

Processing Ephemeris Data

An ephemeris file broadcast includes predictions of a satellite location for a period starting from an update time per a timing resolution of, for example, 5 minutes. The ephemeris file includes a new predicted location of the satellite every timing interval or resolution, in the form of $x_S$, $y_S$ and $z_S$. These values or interpolations thereof may be inserted into SFNP broadcasts to terminals. For example, a linear interpolation using the two adjacent data points from the ephemeris file to calculate $x_S$, $y_S$ and $z_S$ values based on the SFNP transmission instant. Assuming $SFNP_N$ is expected to transmit at time $t_0$, and $(x_S^*, y_S^*, z_S^*)$ represents the estimated satellite location to be sent in $SFNP_N$.

The interpolation process may include finding the interval from ephemeris file where $t_0$ lands in. Assuming $T(i)$ represents the time instant corresponding to the i-th row of ephemeris data, find i such that $T(i) \leq t_0 < T(i+1)$. This finding provides the closest ephemeris prediction before and after expected transmission instant $t_0$. The interpolation process may include computing $(x^*_S, y^*_S, z^*_S)|_{t=t_0}$, the estimated satellite xyz at time $t_0$, using the i-th and (1+1)-th row of ephemeris data as $$\alpha = \frac{t_0 - T(i)}{T(i+1) - T(i)}$$

$$(x_S^*, y_S^*, z_S^*)|_{t=t_0} = (1 - \alpha) * (x_S, y_S, z_S)|_{row=i} + \alpha * (x_S, y_S, z_S)|_{row=i+1}$$

where $(x_S, y_S, z_S)|_{row=i}$ refer to satellite location from the i-th row of ephemeris data.

Error in Ephemeris Files and Estimation

The interpolation processing of the ephemeris file may introduce errors. An ephemeris file may include an error in predicting the satellite motion. The error may accumulate and increase through time and after 24 hours, when the next ephemeris update is due for example, the error is typically made range between 1 to 2 km in some cases. Sometimes, the error can get significant if unplanned satellite maneuvers occur between ephemeris updates. To handle these situations, the round-trip time difference may be calculated. If the round-trip time difference exceeds a soft threshold, a floating window or smoothing filter may be applied on the new ephemeris file to make sure the concatenation from old to new ephemeris file is a smooth transition. When the round-trip time difference exceeds a higher threshold (hard threshold), the new file may be deemed erroneous and a resend of new ephemeris may be requested. Using a higher symbol rate for an inroute provides more accurate timing calculation. Ephemeris file errors may be tracked and corrected by CLT corrections.

A Gateway may use linear interpolation to predict satellite location at any time instant between two known locations in ephemeris. This assumes that satellite is moving in a straight line within every interval; however, the actual trajectory is not straight. This error gets significant when the time interval between two adjacent data points is long. With the five-minute exemplary interval, this error is negligible.

Modeling Ephemeris Error

In an EBT-CLT method simulation an ephemeris error was modeled. A distribution of ephemeris errors across a 1500-day simulation in x, y and z axis, all show two humps as a result of the simulated random bias of ephemeris file from the model. The overall ephemeris error combined from 3 axes, calculated as the distance between ephemeris predicted and actual satellite coordinate maxed at approximately 2 km.

Aperture Sizing

The aperture size required for the ephemeris-based timing mode depends on the random errors from various sources. The error due to the terminal location may be compensated by the initial timing correction. The threshold for using CLT rather than EBT depends only on random errors. A probability distribution curve determines the total probability of bursts that might arrive outside the aperture. Both values, Td and aperture size may be chosen from the probability distribution. The aperture sizing may be done using the following rules $$\text{Aperture}_{size} = f(T_{random\_err\_hw}, T_{random\_err\_eph})$$

IDLE Timer

EBT eliminates the need for a terminal to go through ASCMA or BOOTSTRAP ALOHA every time the terminal transitions from PHY_IDLE (differentiating it from the BW_ACTIVE). In some embodiments, an IDLE Timer is not needed. The terminal may send bursts (ASCMA/TDMA) when the terminal has acquired the timing from the SFNP arriving, except when there is a drift in the ephemeris error. There is always some random error which is budgeted for in the aperture, but a drift in the error is not. The CLT may be used to deal with the error drift if any. A PHY_IDLE terminal will not have these CLT messages and may have a much higher probability of falling outside the aperture when they transmit back.

In some embodiments, when a terminal is in PHY_IDLE for longer than a timer threshold, the terminal may perform an ASCMA or Aloha, and request a timing feedback and only then continue. Although this approach solves the issue a correct value for the timer cannot be determined. It is also too aggressive and may hurt the ASCMA data response time and some of the bursts may be lost.

In some embodiments, a modified SFNP may include a flag (for example, "RESYNC_NOW") set by the GW requesting reacquisition of timing synchronization by a terminal, for example, a PHY_IDLE terminal for reactivating. This flag may be set until a transition to the next ephemeris file has completed. This flag may be set when there is a rise in the amount of CLT needed by a threshold percentage since the ephemeris file transitioned or a smoothing operation is necessitated by a transition in the ephemeris file or within a file.

Validation of Ephemeris Files

Figure 3A:
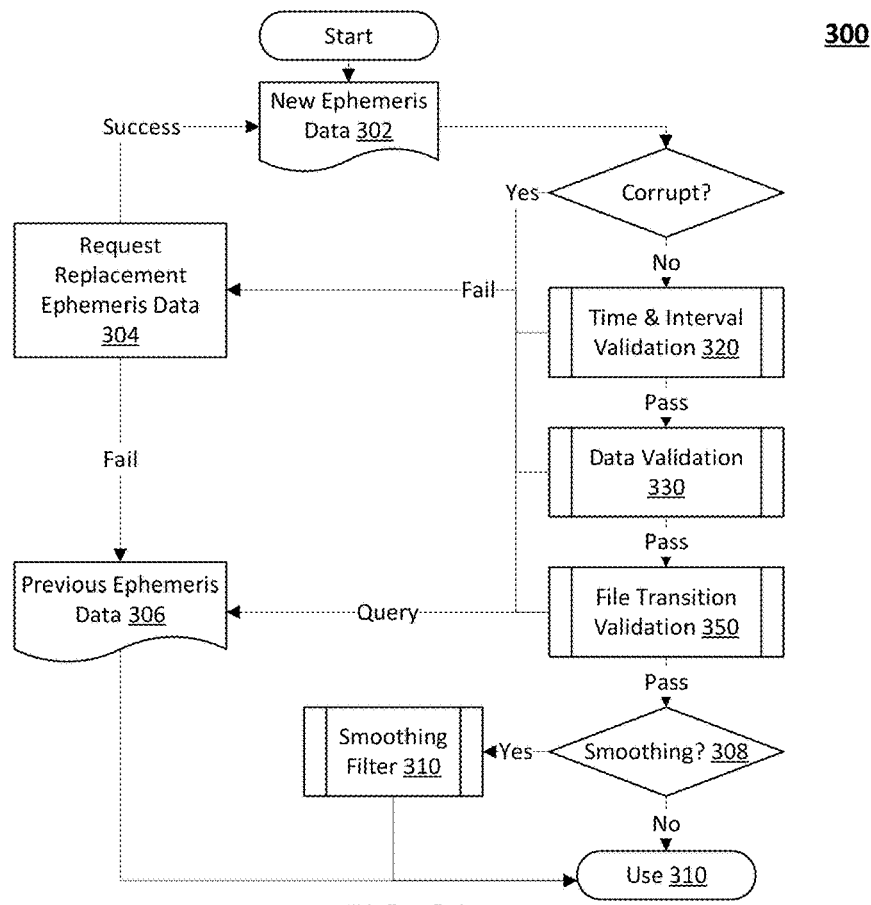
FIG. 3A illustrates a flowchart of a method for validating an ephemeris file according to various embodiments.

FIG. 3A illustrates a flowchart of a method for validating an ephemeris file according to various embodiments.

A method 300 for validating an ephemeris data may perform various checks including Time-Interval validation 320, Data validation 330 and a File transition validation 350 on new ephemeris data 302. Each of the Time-Interval validation 320, the Data validation 330 and the File transition validation 350 may return with a Pass/Fail flag. If any of the Time-Interval validation 320, the Data validation 330 or the File transition validation 350 fail, an operation 304 to request new ephemeris file data may be performed. If any of validations checks fail, an alarm may be raised. If operation 304 to request new ephemeris file data fails, the previous ephemeris data 306 remains. A smoothing flag 308 may determine an invocation of a smoothing filter 310. The smoothing flag 308 may be set by one or more of the Time-Interval validation 320, the Data validation 330 or the File transition validation 350. The method 300 results in using either the previous ephemeris data 306, the new ephemeris data 304, or an output of the smoothing filter 310 (smoothed ephemeris data (not shown)).

Time and Interval Validation

Figure 3B:
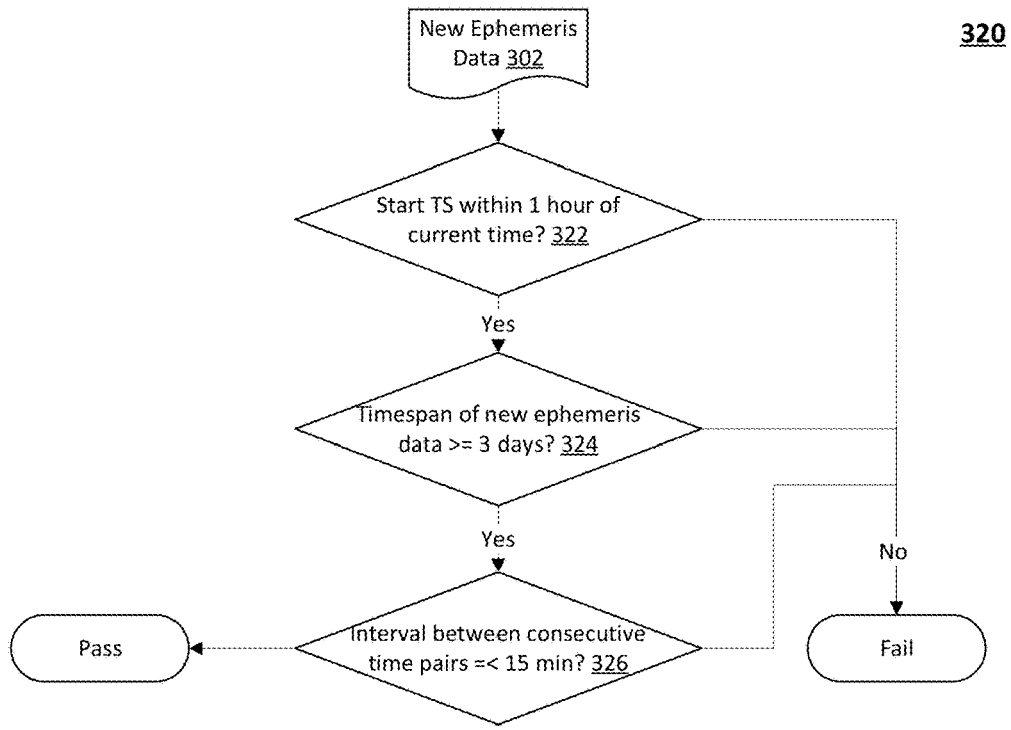
FIG. 3B illustrates a flow chart of the Time-Interval validation 320 of new ephemeris according to various embodiments.

FIG. 3B illustrates a Time-Interval validation 320 of new ephemeris data according to various embodiments.

The Time-Interval validation 320 ensures the timestamps of each row of data in the new ephemeris data are valid. The Time-Interval validation 320 checks at operation 322 that the start and end time of new ephemeris data is within a threshold of current time, for example within one hour of current time. The Time-Interval validation 320 checks at operation 324 that the timespan of new ephemeris data is greater than or equal to a threshold, for example greater than or equal to 3 days of data. The Time-Interval validation 320 checks at operation 326 that the time interval between consecutive time pairs of data is less than a threshold, for example, less than or equal to 15 minutes between consecutive pairs.

Data Validation

Figure 3C:
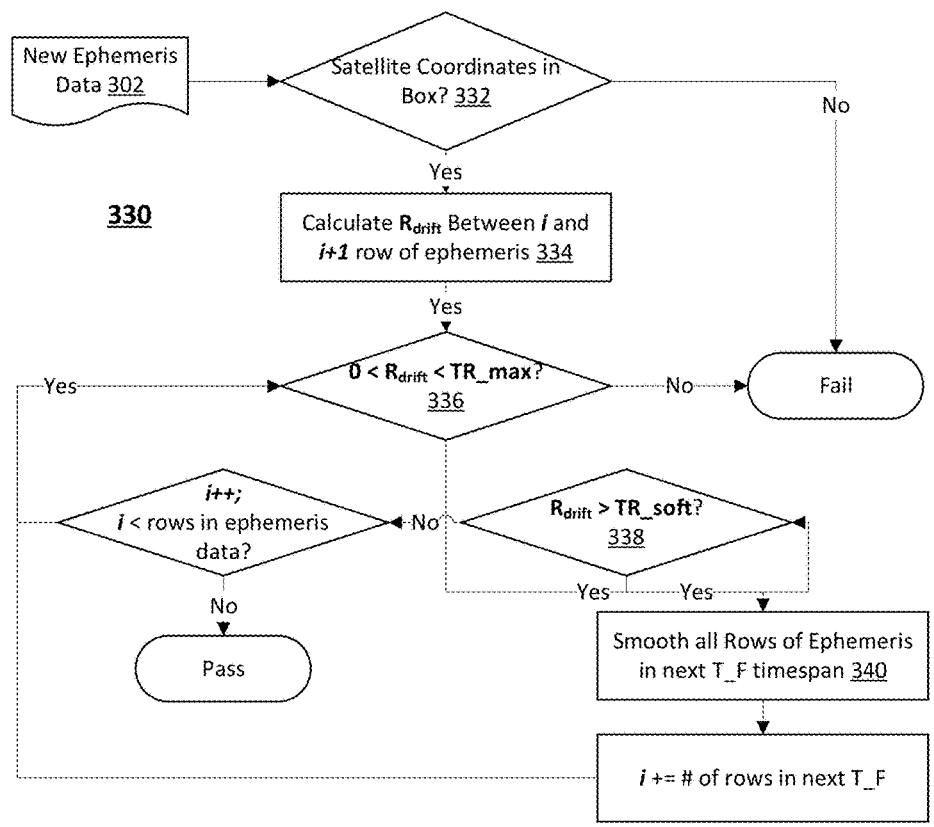
FIG. 3C illustrates a flow chart of the Data validation 330 of new ephemeris data according to various embodiments.

FIG. 3C illustrates a flow chart of the Data validation 330 of new ephemeris data according to various embodiments.

Data validation 330 checks whether satellite coordinates in the ephemeris data are within bound 332 and ascertains that the system will not lose synchronization as a result of using that data. The synchronization may be lost when the burst receive time falls outside an aperture at the GW. Data validation 330 checks that an error in the prediction between two instances is lower than an amount that causes a burst using the timing to fall outside the aperture. The timing of a terminal could be at the edge of the aperture and as such an available window for timing synchronization may not be the complete aperture but only the portion between the threshold $T_d$ and an aperture boundary. A rapid change in error between the prediction and actual satellite location may arise from a rapid change in the ephemeris without the satellite moving or vice versa. A satellite's motion is generally gradual and hence countering any rapid change in the ephemeris file is sufficient to keep the error in prediction low. Data validation 330 may not counter random errors; however, it is effective to remedy a continuous or systematic error.

The present disclosure uses exemplary ephemeris data disposed in rows sorted by an interval start time; however, other formats to provide the ephemeris data are included. As the time intervals between two line-elements in the ephemeris and the interpolation and frequency of those data points before distributing the ephemeris to terminals is not fixed, the present teachings rely on the rate of change in timing to validate the data of the file. The rate of change in timing or the RTT drift rate between any two adjacent rows of data is termed as $R_{drift}$. The maximum $R_{drift}$ calculated 334 across all rows of current ephemeris file, denoted by $R_{d-max}$, should be less than a threshold 336 to ensure no terminals in the system do not lose timing synchronization. When the threshold 338 is exceeded, a smoothing filter 340 may be used to lessen the effect of a transition between two adjacent rows of data. This is to prevent terminals from losing synchronization due to the sudden change in the predicted satellite position.

The data may be checked to validate a location value is not repeated. In one embodiment, checking that a maximum $R_{drift}$ calculated across all rows of current ephemeris data does not equal zero is sufficient.

Calculation of $R_{drift}$

A worst-case round trip time drift rate $R_{drift}$, a worst-case $T_{RS}$ skew $\Delta T_{RS-max}$ and $T_{HS}$ skew $\Delta T_{HS-max}$ may be calculated separately and combined for determining a maximum RTT difference $\Delta RTT_{max}$. The calculation of $\Delta T_{RS-max}$ and $\Delta T_{HS-max}$ may be based on propagation delay from satellite locations from two ephemeris vectors. The two vectors are denoted by $V_{S0}=(x_0, y_0, z_0)$ and $V_{S1}=(x_1, y_1, z_1)$. $V_{H-i}=(x_{H-i}, y_{H-i}, z_{H-i})$ may represent the coordinate vector of Gateway i, and $V_{R-j}=(x_{R-j}, y_{R-j}, z_{R-j})$ may represent beam center coordinate vector of Beam j. Thus, for each specific GW with GW ID i, $\Delta T_{HS}$ can be specifically calculated as $$\Delta T_{HS-i} = \frac{|V_{S0} - V_{H-i}| - |V_{S1} - V_{H-i}|}{c}$$

And $\Delta T_{RS}$ for Beam j may be calculated as $$\Delta T_{RS-j} = \frac{|V_{S0} - V_{R-j}| - |V_{S1} - V_{R-j}|}{c}$$

Where $|V|$ is the L2-norm of vector V, and c is speed of light in vacuum. Once $\Delta T_{HS}$ and $\Delta T_{RS}$ are calculated for all GWs and Beams, we find out the maximum and minimum $\Delta T_{HS}$ and $\Delta T_{RS}$ among the group. The GW ID and Beam ID are $i_0$, $i_1$, $j_0$ and $j_1$, which satisfies $\Delta T_{HS-i_0}=Max(\Delta T_{HS-i}) \forall i \in G$ $\Delta T_{HS-i_1}=Min(\Delta T_{HS-i}) \forall i \in G$ $\Delta T_{RS-j_0}=Max(\Delta T_{RS-j}) \forall j \in B$ $\Delta T_{RS-j_1}=Min(\Delta T_{RS-j}) \forall j \in B$ G and B represent the sets of all GW IDs and Beam IDs. As a result, by combining worst-case $\Delta T_{HS}$ and $\Delta T_{RS}$ in both directions (max and min), a worst-case round trip time difference between any arbitrary GW-Beam pairs, in both directions, may be calculated as:

$\Delta RTT_{pos-max}=Abs(\Delta T_{HS-i_0}+\Delta T_{RS-j_0})$ $\Delta RTT_{neg-max}=Abs(\Delta T_{HS-i_1}+\Delta T_{RS-j_1})$.

These values correspond to the worst-case RTT difference between satellite located at $V_{S0}$ and $V_{S1}$, in positive and negative direction. As such, the RTT based on the next ephemeris vector may be either extended or shortened from the previous ephemeris vector. By taking their absolute value, the maximum RTT delta $\Delta RTT_{max}$, whether it increases or decreases, and $R_{drift}$ may be calculated as $$\Delta RTT_{max} = Max(\Delta RTT_{pos-max}, \Delta RTT_{neg-max}).$$

$$R_{drift} = \frac{\Delta RTT_{max}}{\Delta T}; \Delta T \text{ time gap between two ephemeris points.}$$

For any $R_{drift}$ calculation mention in this section, the process is as outlined above. If this calculation is being done between two different datasets, the time gap would usually be equal to the time difference between two, line elements of the ephemeris datasets, provided they are synchronized. If the calculation is being done for the elements in the data, then the time gap is the time difference between two, line elements, for example, set to 5 minutes in this disclosure. If $R_{drift}>TR_{max}$ then an alarm may be raised, and the current data may be discarded. If $R_{drift}<TR_{soft}$ then the data may be used as is. If it falls in between the two thresholds, then the transition may be smoothened using a filter. If there are multiple points within a dataset which satisfy the criteria $TR_{soft}<R_{drift}<TR_{max}$, then that dataset may be declared invalid, and an alarm may be raised.

$TR_{soft}$ and $TR_{max}$ may be calculated. If Td is a threshold for CLT and $Aperture_{size}$ is the aperture length, then a maximum jump in the timing error tolerable by any terminal without losing synchronization is $$\left(\frac{Aperture_{size}}{2} - T_d\right).$$

This jump in timing may be intolerable between two consecutive SFNP messages but may be tolerable if it is over a longer period. In some embodiments, a terminal may be slightly outside the aperture and a CLT has not been received because of the RTT delay. In some embodiments, only a small fraction of the theoretically possible maximum may be used as a soft threshold beyond which smoothing may be needed for the transition. The maximum threshold $TR_{max}$ beyond which the system may declare an alarm is the rate which cannot be smoothened out in the time frame $T_f$. Smoothening should bring the drift rate below $TR_{soft}$ in a period of $T_f$, for example, no longer than 4 hours. The smoothing may allow for the maximum rate of drift in the system due to satellite motion, for example, 12 ns/s. Exemplary thresholds and smoothing process parameters are as follows:

| Parameter | Default value | Minimum value | Maximum value |
| --- | --- | --- | --- |
| $TR_{soft}$ | 100 ns/s | 50 ns/s | 150 ns/s |
| $TR_{max}$ | $(TR_{soft} - 12)*\frac{T_f}{\Delta T}$ | $(TR_{soft} - 12)*\frac{T_f}{\Delta T}$ | $(TR_{soft} - 12)*\frac{T_f}{\Delta T}$ |
| $T_f$ | 7200 secs | 1 hour or 3600 secs | 4 hours or 14400 secs |

Smoothing the Transition

The transition may be smoothened by the weighted average of the two ephemeris points. If $T_{transition}$ is the time in the ephemeris data where the transition was detected and $T_{transition}+T_F$ is the time in the ephemeris where a transition to is desire, then the filter may operate as:

$$Eph(t) = \begin{cases} Eph(t), & t < T_{transition} \\ Eph(T_{transition}) * \alpha + Eph(T_{transition} + T_F) * (1-\alpha), & T_{transition} \le t < T_{transition} + T_F \\ Eph(t), & t \ge T_{transition} + T_F \end{cases}$$

$$\text{Where } \alpha = \frac{T_{transition} + T_F - t}{T_F}$$

File Transition Validation

Figure 3D:
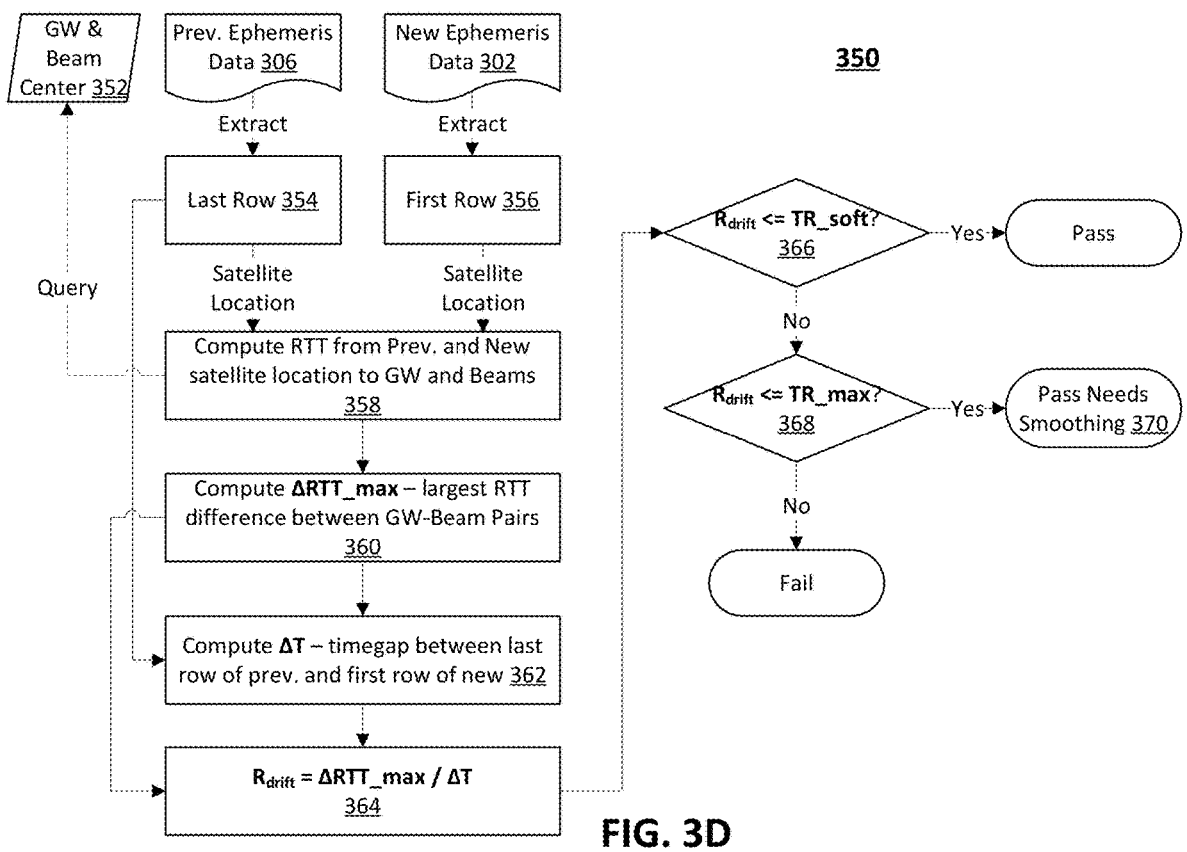
FIG. 3D illustrates a flow chart of the file transition validation 350 according to various embodiments.

FIG. 3D illustrates a flow chart of the file transition validation according to various embodiments.

An error in a previous ephemeris data may accumulate and transitioning to a new ephemeris file may cause some problems if the error exceeds a limit, for example, due to a 'step jump' observed at the terminals during the transition instant. The inroute may possibly be flooded by new CLT requests from a large number of terminals and some terminals may lose timing synchronization. As a result, the 'step jump' may be bounded. In some embodiments, a smoothing filter may be used to handle situations with a moderate ephemeris transition. Parameters ($TR_{soft}$ and $TR_{max}$) used in this process remains the same as described in the above table.

Smoothing Filter

The smoothing filter may be applied between two files when the jump between two points is larger than $TR_{soft}$. Smoothing may be performed across the two datasets instead of just one. The time instant when the system is about to transit from the previous ephemeris data to the new data is denoted by $T_{transition}$. When $TR_{soft} \le R_{drift} \le TR_{max}$, then the beginning of the new ephemeris file may be smoothed in a way that it takes the weighted average of old and new ephemeris. If Eph(t) represents the ephemeris data (satellite location in (x,y,z)) to be broadcast at time instant t, the resulting ephemeris series after smoothing may be written as $$Eph(t) = \begin{cases} Eph_{old}(t), & t < T_{transition} \\ Eph_{old}(t) * \alpha + Eph_{new}(t) * (1-\alpha), & T_{transition} \le t < T_{transition} + T_F \\ Eph_{new}(t), & t \ge T_{transition} + T_F \end{cases}$$

$$\text{Where } \alpha = \frac{T_{transition} + T_F - t}{T_F}.$$

$Eph_{old}(t)$ means ephemeris data at time t from the old ephemeris file. Similarly, $Eph_{new}(t)$ means ephemeris data from the newly updated ephemeris file at the current time instant, t. And $\alpha$ is the weight factor used to calculate the weighted average from a combination of old and new ephemeris file. Within the first $T_F$ secs since $T_{transition}$, $\alpha$ may be linearly decreased from 1 to 0 to provide a linearly decreasing weight over the old ephemeris file and an increasing weight over the new ephemeris. By taking the average of all ephemeris data from a combination of both old and new ephemeris data in the floating window period, a smooth transition may be ensured, and terminals may gradually correct their timing from the old ephemeris to the new. In some embodiments the smooth transition may be assisted by CLT feedbacks.

Figure 3E:
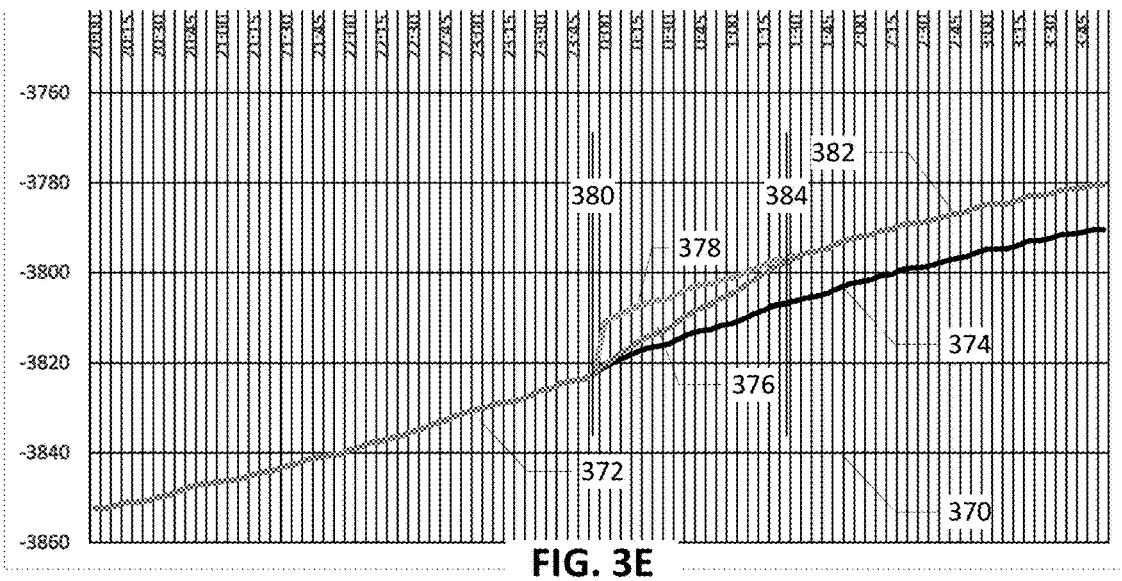
FIG. 3E illustrates an application of the smoothing filter 310 according to various embodiments.

FIG. 3E illustrates an example of ephemeris series (in ECEF x coordinates) to be broadcast on SFNP an outroute after weighted average smoothing compared with the original old and new ephemeris file according to various embodiments.

A chart 370 illustrates a satellite's location over time. Lines 372 and 374 illustrate satellite location calculated per old ephemeris data. The line 372 illustrates the satellite location prior to a transition start instant 380 ($T_{transition}$ as described above), while line 374 illustrates the Satellite location calculated per the old ephemeris data if no new ephemeris data is transitioned to at the transition start instant 380. Lines 378 and 382 illustrate satellite location calculated per the new ephemeris data. The line 378 illustrates the satellite location calculated from the new ephemeris data at the transition start instant 380 to a transition end instant 384 ($T_F$ as described above), while line 382 illustrates the Satellite location calculated per the new ephemeris data after the transition end instant 384. Line 376 illustrates a weighted average smoothing ($\alpha$ as described above) of the calculated Satellite location from the transition start instant 380 to the transition end instant 384. At the transition start instant 380, a delta in the satellite location coordinate from line 372 to line 378 is the difference in the satellite locations between previous and new ephemeris data that is smoothed out by a smoothing filter.

Inroute Synchronization Using Closed Loop Timing ($EBT_{CLT-only}$)

In the present teachings, in one mode, a combination of $T_{RO}$ based $T_{HSH}$ polling and the closed loop feedback maybe used to compute TRO for inroute frame timing. In some embodiments, a mode ($EBT_{CLT-only}$) using a closed loop for timing correction feedback is disclosed. The terminal may use $T_{RO}$ correction information from gateway for its own timing computation. When ephemeris information is available at the gateway, the gateway may frequently transmit an ephemeris vector in an SFNP. A terminal may use the ephemeris vector for its timing calculation. Therefore, no matter what is broadcast in SFNP, for example, CoB or actual satellite ephemeris, the terminal may process the SFNP information in the same manner for its timing calculation. Thus, mode may be viewed as a sub mode of EBT timing synchronization. This mode may be referred to as $EBT_{CLT-only}$ mode or CLT-only method in the present teachings.

In contrast to prior art, in the $EBT_{CLT-only}$ mode each terminal runs its inroute timing calculation independently through closed loop timing. At the gateway side, if the difference between actual burst arrival time from a specific terminal and the ideal burst arrival time (i.e. aperture center) exceeds a pre-defined threshold $T_d$, the gateway may send a feedback message including a recommended timing offset based on the timing error measured at the gateway. Then the terminal may use this correction message to adjust its timing. This feedback maybe be sent within a short period of time (normally no longer than 100-200 sec, depending on aperture size and Td), to ensure that the terminal transmissions do not fall out of the GW receive aperture. Depending on the number of active terminals in a beam and CLT threshold $T_d$, overhead management traffic on the outroute may include timing correction messages to specific terminals. Simulation results show that when using $EBT_{CLT-only}$ method, inroute efficiency is improved by reducing inroute aperture size to around 10 μs.

Initial Calculation of TRO Via ASCMA

Figure 4:
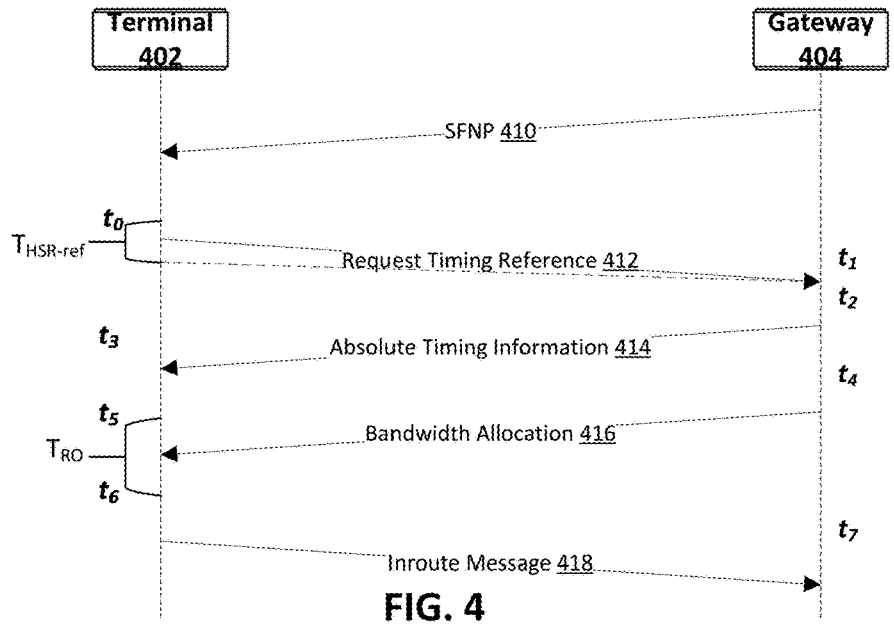
FIG. 4 illustrates a timing synchronization establishment through ASCMA according to various embodiments.

FIG. 4 illustrates a timing synchronization establishment through ASCMA according to various embodiments.

A terminal 402, new or idle, may receive a message 410 including an SFNP to help the terminal gain timing information (for example, frame boundaries) for an initial transmission send requesting timing information. The initial message may be transmitted using an asynchronous transmission, for example, an ASCMA burst. The terminal 402 may transmit the burst to request timing reference at $t_0$ via message 412. The gateway 404 may receive the burst at $t_1$. After some processing time, at t2, the gateway 404 may send a message 414 including t1 (for example, in the form of frame #, slot # and symbol #). The message 414 may include absolute timing information for the terminal 402 to calculate its timing offset when determining a transmission time for bursts. At $t_3$ the terminal 402 receives message 414 from the gateway 404 and calculates a propagation delay for further reference as, THSR-ref=t1–t0. Within a short period after t3, the gateway 404 sends a bandwidth allocation information via message 416 at $t_4$ giving transmission permission to terminal 402. Upon reception of $SFNP_N$ as message 416 at t5, the terminal 402 calculates its own timing offset ($T_{RO}$) based on knowledge of THSR-ref. The terminal 402 may add some adjustment in TRO to make sure any inroute message it sends arrives in aperture at the gateway 404. The terminal 402 transmits an inroute message 418 at time instant ($t_6$) determined by TRO. If TRO is calculated correctly, inroute message 418 arrives at gateway right around the desired time instant ($t_7$), timing sync established for the terminal 402. The ideal $T_{RO}$ value should satisfy $T_{RO-ideal}=T_{HO}-T_{HSR}*2$, where $T_{HSR}$ indicates the ground truth one-way propagation delay from gateway 404 to terminal 402 via a satellite (not shown).

Terminal 402 may gain its own $T_{HSR-ref}$ after initial burst by measuring the interval between its own transmission instant (t0) and gateway reception instant (t1). In $EBT_{CLT-only}$ mode, terminal 402 may receive CoB coordinates from outroute SFNP as ephemeris information, calculates its $T_{HSR-NOM}$, and thus calculate the expected burst reception time instant by the gateway 404, denoted by $t^*_1$. With the knowledge of t1 and $t^*_1$, the initial estimated TRO ($T_{RO-est}$) may be computed as follows:

$$t^*_1 = t_0 + T_{HSR-NOM}$$

$$T_{HSR-offset} = t_1 - t^*_1$$

$$T_{HSR-ref} = T_{HSR-NOM} + T_{HSR-offset} = t_1 - t_0$$

$$TRO\text{-}est = THO - THSR\text{-}ref*2$$

Terminal 402 may then use this $T_{RO-est}$ for its own determination of transmission time.

In some embodiments, when ASCMA is not supported, a newly installed terminal or idle terminal may use ranging ALOHA or BOOTSTRAP ALOHA bursts to establish its initial timing. The initial timing bursts may be based on superframe synchronization via SFNP, and computation of $T_{HSH-NOM}$ and $T_{SRS-NOM}$ on the terminal side. The terminal may obtain its $T_{RO-est}$ for timing after a successful ranging ALOHA session. For the following sections, it is assumed that terminal has successfully gained $T_{RO}$ estimation with or without ASCMA and any further calculations remain the same with existing $T_{RO}$ estimation.

Computation of $T_{RO-est}$ During Stream Traffic

Actively transmitting terminals may receive consolidated CLT messages from the gateway to correct their $T_{RO-est}$. Timing correction feedback need not be provided for every burst. The feedback may be provided to a terminal when the aperture offset error of a received burst exceeds a certain threshold. Moreover, in some embodiments even when the threshold is exceeded, a timing correction message may not be immediately sent to an individual terminal. Corrections to terminals may be aggregated over a period into a single message before they are sent out to reduce outroute bandwidth usage.

The operation of the CLT may be summarized as follows. A terminal transmits stream packets on its allocated bandwidth, based on its current $T_{RO-est}$ value. The gateway monitors the timing error for bursts from each terminal (i.e., the difference between the center of the aperture and the last symbol of the UW). If the timing error exceeds a configurable timing drift threshold and an interval longer than $T_{HO}$ has elapsed since the last timing correction message was sent to this terminal, the gateway adds the terminal and its timing correction to a list of CLT messages that need to be sent out. A consolidated CLT message is sent to all the terminals on this list if either the number of terminals on the list exceeds a certain minimum number (nCLT) or a timing correction message is pending for the terminal for more than a certain number of frames (a duration of $CLT_{timeout}$). The terminal receives the CLT correction message, and makes the correction to its $T_{RO-est}$ to obtain new $T_{RO-est}$.

The CLT message sent out by gateway may include a set of {terminal #, $n_{offset}$} pairs, up to a total of nCLT pairs. Each pair may include a specific terminal id (terminal #) and its TRO correction offset ($n_{offset}$). $n_{offset}$ indicates the number symbol durations between desired and actual arrival instant. It may be a multiple of 0.5 because the measurement of burst arrival has a time resolution of $T_S/2$. For example, $n_{offset}$ being 1 means the timing offset is 0.5 symbols, a value of 2 means 1.0 symbols, and the like. As the burst can arrive earlier or later than an aperture center, $n_{offset}$ can be positive or negative. Whenever a terminal receives the CLT correction message, the terminal may update its $T_{RO-est}$ based on the offset value. An example of this closed timing feedback loop is expressed as follows:

1. On GW inroute frame N, GW receives an inroute burst from a terminal in slot k. It is expected to arrive at the i-th symbol in slot k. But with some error, it arrives at the j-th symbol. The measurement of burst arrival has a time resolution of $T_S/2$. So i and j will be an integer value or integer plus 0.5. So, $n_{offset}$ calculated as delta between i and j will also be a multiple of 0.5. For example, $n_{offset}=i-j$ and $t_{offset}=n_{offset}*T_S$. Positive values of $n_{offset}$ and $t_{offset}$ indicate that burst arrives early, and negative values indicates that burst arrives late.
2. Gateway compares $t_{offset}$ with CLT threshold $T_d$. If the absolute value of $t_{offset}$ is greater than $T_d$, a CLT message including the $n_{offset}$ value is sent to the terminal.
3. The CLT message may be buffered at the GW and sent out from the gateway when nCLT such correction messages for different terminal have been buffered or a CLT message has stayed in the buffer for a period in excess of $T_{BUFFER}$.

4. After the terminal receives CLT message, it uses the new $n_{offset}$ value to update $T_{RO\text{-}est}$.

$T_{RO\text{-}est}(\text{new}) = T_{RO\text{-}est}(\text{old}) + n_{offset} * T_s$ 5. With updated $T_{RO\text{-}est}$, the terminal may send inroute bursts with more accurate timing, before the burst drifts out of aperture due to satellite motion and random timing errors.

When a terminal is already on the list of $T_{RO}$ corrections to be sent but a newer payload burst from that terminal just came in with different value of $T_{RO}$ error, the gateway may use the newer observation, meanwhile the $CLT_{timeout}$ timer will not be reset. The terminal may listen for CLT feedback for at least a period of ($CLT_{timeout} + T_{HO}$) sec after its latest transmission.

Predicting the RTT/TRO to Decrease CLT Messages

To decrease the number of CLT messages being sent, the terminal may predict the RTT delay to the GW and hence the $T_{RO}$. The terminal may use the past CLT correction messages to predict the next value. After the terminal stays IDLE for a certain period, the CLT corrections are stale, and the prediction block may clear the old CLT messages and reset. Using the predicted value, the terminal may keep sending bursts that arrive in the aperture for longer. The predicting may be based on linear interpolation, cubic interpolation, machine learning or the like. The predictor may yield a 75% reduction in the messages sent with a +/−3.5 μs error. The linear prediction can be done with the following equation in which x is the time when the CLT messages arrived; x[−1] and x[−2] are times for the previous two CLT messages; x[0] is the current time; y is $T_{RO}$; y[−1] and y[−2] are the previous two CLT message $T_{RO}$ values; and y[0] is current $T_{RO}$ value.

$$y[0] = y[-1] + (x[0] - x[-1]) * \frac{y[-1] - y[-2]}{x[-1] - x[-2]}$$

|  | CLT/day | CLT/day error = 0.5 us | CLT/day error = 1 us |
|---|---|---|---|
| Linear | 24 | 24 | 24 |
| Cubic | 12 | 18 | 104 |
| None | 104 | 101 | 100 |

Figure 5A:
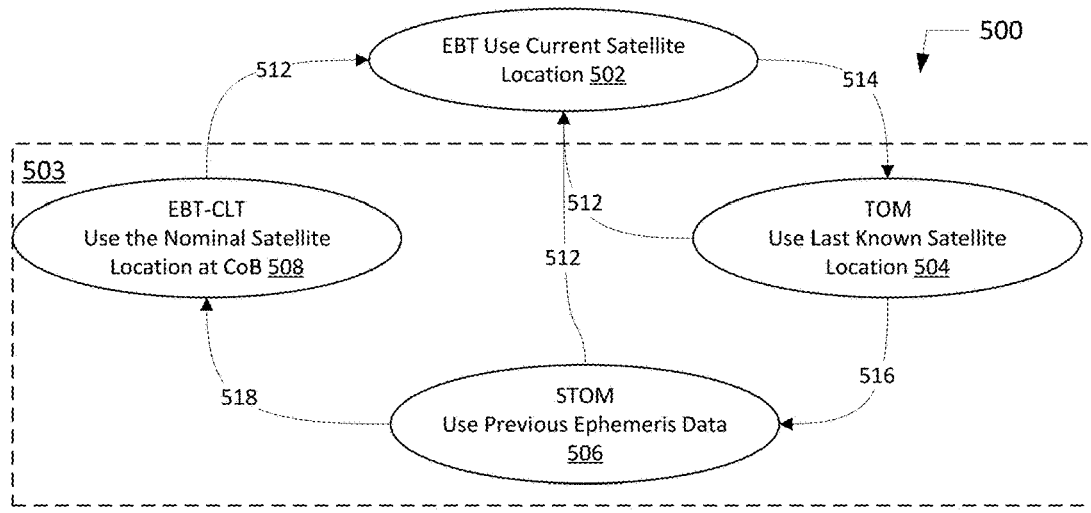
FIG. 5A illustrates an Ephemeris Outage Handling Process according to various embodiments.

Switch Between Timing Synchronization Modes— EBT Mode to $EBT_{CLT\text{-}only}$ Mode FIG. 5A illustrates an Ephemeris Outage Handling Process according to various embodiments.

An Ephemeris Outage Handling Process is illustrated in FIG. 5A for a system 500. The system 500 preferably operates in EBT mode 502 as it has a smaller normal aperture size and less outroute CLT traffic compared with an CLT-only mode 503. The EBT mode 502 needs valid ephemeris data and uses a current satellite location. When ephemeris data is unavailable, the system may switch to the CLT-only mode 503. The $EBT_{CLT\text{-}only}$ mode in this section or "CLT-only" refers to the fact that the satellite location broadcast in the SFNP is determined based on a CoB location of a satellite (not shown). A terminal may use the same process for timing synchronization in the CLT-only mode 503 as used in the EBT mode 502. In CLT-only mode 503, a satellite movement is tracked by the CLT messages for each terminal. The satellite location may be transmitted in the SFNP similar to the EBT mode 502.

At the instant when there is no valid ephemeris data, the satellite is assumed to be anywhere inside the station keeping box and the system 500 transitions 514 from EBT mode 502 to CLT-only mode 503. Timing adjustments of each terminal may be based on the last broadcast ephemeris data. However, in CLT-only mode 503, terminals may save their timing reference as a timing difference from the satellite Center of Box (CoB). As a result, terminals cannot directly use the CoB coordinates for timing calculation because this may immediately and simultaneously introduce a large timing offset for active terminals. It is likely that terminals missed their aperture and need to establish a reference timing via ASCMA, for example. Depending on the duration of ephemeris outage (temporary, short-term or long-term), the handling and processing of EBT outage modes can be different corresponding to a TOM mode 504, a STOM mode 506 and an EBT-CLT mode 508.

A transition 514 from the EBT mode 502 to the TOM mode 504 of the CLT-only mode 503 occurs when ephemeris outage onsets. After some duration of outage (for example, after 1-hour), a transition 516 from the TOM mode 504 to the STOM mode 506 onsets. After some duration of outage (for example, after 12 hours), a transition 518 from the STOM mode 506 to the EBT-CLT mode 508 onsets. When valid ephemeris data becomes available, the gateway may begin a direct transition 512 from the CLT-only mode 503 to EBT mode 502. The following table summarizes exemplary features and differences between EBT outage states used in the CLT-only mode 503.

| Outage state | Temporary | Short-term | Long-term |
|---|---|---|---|
| Exemplary Durations defining outage states ($T_{out}$) | 0~1 hrs | 1~12 hrs | >12 hrs |
| Ephemeris data to be used for outage | Fixed point, last valid ephemeris location | Ephemeris series from previous 24 hours before outage | A straight-line satellite trajectory moving towards CoB |
| When timer expires (no new ephemeris) | Switch to short-term outage state | Switch to long-term outage state | Switch to $EBT_{CLT\text{-}only}$ mode |
| Exemplary Transition type (when new ephemeris becomes available) | Direct transition to EBT or short-term (e.g., 2-hour) smoothed transition | Direct transition to EBT or short-term smoothed transition | Direct transition to EBT, a short-term or long term (e.g., 12-hour) smooth transition |

Figure 5B:
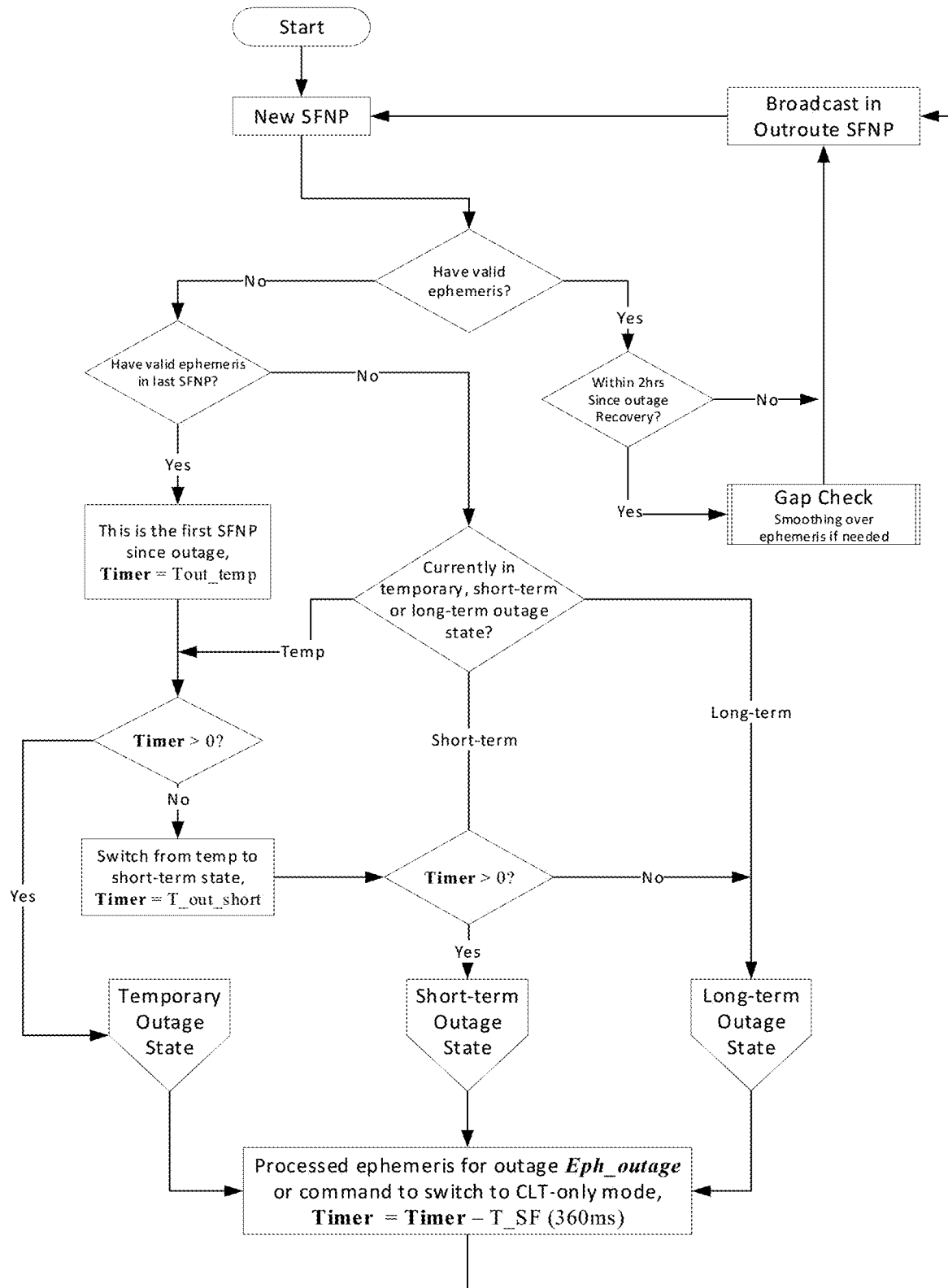
FIG. 5B illustrates a flowchart of an Ephemeris Outage Handling method according to various embodiments.

FIG. 5B illustrates a flowchart of an Ephemeris Outage Handling method according to various embodiments.

Switch Between Timing Synchronization Modes—Temporary Ephemeris Outage

If ephemeris data is temporarily unavailable but may be available in a short time, the gateway may keep broadcasting the last valid satellite location on outroute as predicted ephemeris. This assumes that the satellite movement remains static during the outage period. Because the satellite is not expected to move very far during this period of time, whenever the new ephemeris file becomes available validation checks are performed over the new data and system does one of the following:
- Case 1: New ephemeris passes all validation checks and does not need smoothing during transition. Gateway immediately starts using new ephemeris. This could happen if the outage occurs during a period when satellite is moving in a way that RTT does not change much.
- Case 2: New ephemeris file passes all validation checks and requires smoothed transition based on Gap Check results. A 2-hour smoothing period is scheduled on the beginning 2-hour span of data from the new ephemeris file.
- Case 3: New ephemeris file does not pass validation checks or it is not available for too long that the timer for temporary outage has expired, system deems this as a short-term outage. Then it switches to short-term outage state.

When ephemeris file is unavailable for a longer time but not too long, the ephemeris series from the previous day is used as a backup ephemeris. For clarity, in the following paragraphs ephemeris from the previous day will be referred as replicate ephemeris. Due to the day-by-day periodicity existed in ephemeris data, a reasonable short-term estimate of satellite trajectory for up to 24 hours is at-hand. Similar with the normal ephemeris transition, the replicate ephemeris sequence may be treated as a new ephemeris file and a smooth period for transition may be applied at the beginning and end depending on the gap when necessary. When a replicate ephemeris fails a pass gap check, the system may transition to $EBT_{CLT-only}$ mode.

Switch Between Timing Synchronization Modes—Long Term Ephemeris Outage

A system transition to $EBT_{CLT-only}$ mode may be triggered when the system is in short-term ephemeris outage state and short-term outage timer has expired, or when replicate ephemeris data fetched from previous day fails file transition validation and gets rejected. A transition to $EBT_{CLT-only}$ mode is performed. In one case, when a timer for short term outage has expired but there is still replicate ephemeris file from previous day ongoing, the gateway looks at this series and find a future time instant $t_{transition}$ where the replicate ephemeris is closest to a satellite CoB. At $t_{transition}$, the transition may be smoothed when the distance from the CoB meets, for example, the criterion used for file transition validation. In a second case, when a short-term outage timed has expired and there is no valid replicate ephemeris file available the system may begin transitioning from ephemeris data location to CoB location, with smoothing transition if necessary, according to a gap check.

The file transition validation that happens at $t_{transition}$ for the cases above remains mostly the same as described above. Here the old ephemeris is the replicate ephemeris at $t_{transition}$ as a constantly ongoing time series and the new ephemeris is CoB. The jump from old to new ephemeris can be either a direct transition, transition with smoothing or rejection. However, in the case of transiting to $EBT_{CLT-only}$ mode, CoB is the only way to go to. Thus, a failed file transition validation in this case will lead to an extended smoothing transition to CoB (for example, a 12-hour smoothing period) instead of the normal smooth transition.

Switch Between Timing Synchronization Modes—$EBT_{CLT-only}$ Mode to EBT Mode Whenever a new valid ephemeris file is available a switch to EBT mode may be performed for better inroute efficiency. The switch may be initiated at a transition instant, $t_{transition}$. In one embodiment, $t_{transition}$ may be the instant when ephemeris is closest to CoB within the first 24 hours of the new ephemeris. At that instant, the transition may start with a smoothed period. A message from the gateway may notify terminals at $t_{transition}$ to start using ephemeris data in SFNP instead of CoB for their timing. During the switch, the gateway may perform the ephemeris data processing and determine $t_{transition}$. At the terminal, the timing reference used during $EBT_{CLT-only}$ mode may be retained and directly used when switching to EBT mode. As the gateway determines the instant when a minimal timing drift occurs, the timing references saved by a terminal remain valid.

Consolidated Ephemeris Data Processing at GW

Preparations for switching between EBT mode and $EBT_{CLT-only}$ mode may be performed at a GW or any other centralized facility. These preparations include smoothing, ephemeris concatenation or transition time decision making are done. A terminal need not know of an ephemeris outage or that a switch process from EBT mode to $EBT_{CLT-only}$ mode is in progress. At any time t during an ephemeris outage, the ephemeris to be broadcast on outroute in terms of satellite ECEF coordinates, denoted by $Eph_{OR}(t)$, may be described as $$Eph_{OR}(t) = \begin{cases} Eph(t_{outage}), & t - t_{outage} < T_{out-temp} \\ Eph_{ST}(t), & T_{out-temp} \leq t - t_{outage} < T_{out-short} \\ Eph_{LT}(t), & t - t_{outage} \geq T_{out-short} \end{cases}$$

Where Eph(t) is the actual ephemeris location at time t from a valid ephemeris file; $T_{out-temp}$ and $T_{out-short}$ are timing thresholds for temporary and short-term outage per the below table; and $Eph_{ST}(t)$ and $Eph_{LT}(t)$ are ephemeris data to be used at time t, during short-term outage and long-term outage, respectively.

| Parameters | $T_{out-temp}$ | $T_{out-short}$ |
|---|---|---|
| Configurable range | $0 \leq T_{out-temp} < T_{out-short}$ | $T_{out-temp} \leq T_{out-short} \leq 24$ hrs |
| Recommended range | 30 min~2 hrs | 12~24 hrs |

If smoothed transition is needed based on a Gap Check results between the ending outage ephemeris and the beginning of replicate ephemeris with an inserted five-minute interval, $Eph_{ST}(t)$ may be written as $$Eph_{ST}(t) =$$
$$\begin{cases} (1-\alpha)*Eph(t_{outage}) + \alpha*Eph(t-24hrs), & t-t_{outage} \leq T_{out-temp} + 2hrs \\ Eph(t-24hrs), & t_{outage} + T_{out-temp} + 24hrs < t < t_{outage} + T_{out-short} \end{cases}$$

Where α is the smooth factor range between 0 and 1 and calculated as $$\alpha = \frac{t - t_{outage} - T_{out-temp}}{2hrs}.$$

If smoothed transition is not needed, $Eph_{ST}(t)$ may be calculated as $Eph_{ST}(t)=Eph(t-24 \text{ hrs})$. Moreover, $Eph_{LT}(t)$ may be written as beneath if smooth transition is needed when moving from replicate ephemeris to CoB location to be used in $EBT_{CLT-only}$ mode $$Eph_{LT}(t) = \begin{cases} Eph(t-24hrs), & t_{outage} + T_{out-short} \leq t \leq t_{transition} \\ (1-\alpha)*Eph(t_{transition}-24hrs) + \alpha*\text{CoB\_xyz}, & t_{transition} < t \leq t_{transition} + 2hrs \\ \text{CoB\_xyz}, & t - t_{outage} > t_{transition} + 2hrs \end{cases}.$$

Where CoB_xyz is the ECEF coordinates of CoB; Smooth factor α is calculated as $$\alpha = \frac{t - t_{transition}}{2hrs}.$$

$t_{transition}$ and chosen such that $$\text{dist}\{Eph(t_{transition}-24 \text{ hrs}), CoB_{xyz}\} = \text{MIN}(\text{dist}\{Eph(t-24 \text{ hrs}), CoB_{xyz}\})$$

for $\forall\, t \in [t_{outage}+T_{out-short}, t_{outage}+24 \text{ hrs}]$; and $\text{dist}\{X, Y\}$ is the distance (L2-norm) of coordinate vectors X and Y. If no smoothing is needed, $Eph_{LT}(t)$ may be expressed as $$Eph_{LT}(t) = \begin{cases} Eph(t-24hrs), & t_{outage} + T_{out-short} \leq t \leq t_{transition} \\ \text{CoB\_xyz}, & t \geq t_{transition} \end{cases}.$$

Inroute Timing Synchronization During GW Diversity Switch

FIG. 6 illustrates a timeline of a switch between gateways for a system including a primary GW and a backup GW according to various embodiments.

A gateway switch may occur at a switch start instant 602. The switch may be initiated due to many factors, when an active/primary GWs capacity cannot be maintained (for example, due to rain fade), when a usually primary GW can maintain its capacity (from a backup back to the usual primary after the rain fade at the primary finishes), maintenance, or the like. When a GW switch occurs, terminals being served by the primary GW 610 lose an Outroute (OR) signal for a short duration and then reacquire it, after a backup GW 620 becomes active. There is a finite amount of time from making the decision to switch to the switch occurring (duration between the switch start instant 602 and a switch end instant 604). During this time, the backup GW 620 may be configured with a same configuration 622 as the active GW. This configuration 622 may include parameters for the operation of the Outroute and Inroute on physical, SLC/MAC and network layers.

After the switch start instant 602 the primary GW 610 continues to perform an outroute Tx and inroute Rx 614 for some duration and thereafter the primary GW performs an outroute Tx and no inroute Rx 616. After the switch end instant 604, the primary GW 610 performs no Tx or Rx 618. After configuration 622, for some period the backup GW 620 performs an outroute Tx and no inroute Rx 624. In some embodiments, the primary GW 610 and the backup GW 620 may transmit the same Outroute traffic before the switch end instant 604 at 628. After the switch end instant 604, only the backup GW 620 performs the Outroute Tx and the inroute Rx at 628.

A satellite 630 takes a finite amount of time for the switch as well. An outroute may be switched 634 prior to switching the inroute 636. As such, an outroute may be lost at the terminal before the inroute. The ground network or satellite control facility may not explicitly know when the satellite 630 switch starts and ends; however, the satellite control facility may implicitly determine a satellite switch start and end from a presence or lack of traffic at the GWs.

The timeline 600 presents a relative sequence of events as it occurs throughout the various elements of the network. The switching timeline is bounded by the switch start instant 602 and the switch end instant 604. The switch start instant 602 is when the decision to switch is made. This coincides with configuring the backup GW 620, sending commands to the SCF 632 to switch the satellite 630, and to start replicating traffic to the backup GW 620. After this, the backup GW 620 is transmitting Outroute traffic but not receiving any Inroute traffic. The satellite forward path 634 switches first and this causes a terminal to lose their outroute and once the switch is complete, they receive the outroute from the backup. The Return path 636 on the satellite switches next and shortly after this point the primary GW 610 stops receiving any inroute traffic at event 606. By event 606, terminals having received the timing information from the outroute from the backup GW 620 for the inroute Rx 624. After the satellite return path is switched, the backup GW 620 starts receiving inroute traffic per 628. After a short period the SCF reports the switch acknowledgment 638 having taken place, for example, after telemetry is received from the satellite 630. Receiving the switch acknowledgment 638 determines the switch end instant 604. After the switch end instant 604, the duplication of traffic is stopped (to the primary GW) and the primary GW 610 stops transmitting and receiving traffic.

For Inroute timing synchronization, there are some trigger points. First, when the switching decision is made, the outroute traffic is duplicated to the backup GW, a switch from SFNP to a Rapid SFNP (RSFNP) is performed and a freezing of bandwidth allocation for time block 662 to terminals of the primary GW 610 occurs at this point. Second, stopping of inroute traffic at primary GW 610 may be triggered by a sudden drastic drop of valid received bursts at the primary GW 610. A bandwidth allocation may restart after this point in time beginning with time block 664. In exemplary embodiments, the outroute scheduling may be provided by an Inroute Group Manager (IGM) or a VSAT Bandwidth Scheduler that may organize the outroutes as a Code Rate Organizer (CRO). The CRO/IGM 660 may start receiving unique word (UW) miss/bad bursts messages from the GW that the satellite is receiving signal from. In some embodiments, the CRO/IGM 660 may suppress the bursts from the back up until event 606 occurs. Lastly, stopping duplication of traffic after the SCF notifies the switch completion at the satellite 630. The CRO/IGM 660 may stop RSFNP and send SFNPs 666, after the switch end instant 604.

The CRO/IGM 660 may undergo the following state transition:
traffic received from Primary GW (IDC locked)
traffic from Primary (IDC locked) and missed traffic from backup (IDC faux locked)
missed traffic from Primary and backup
missed from Primary and received from backup The switch causes disruption in traffic. The total time of disruption is from the time when the terminals lose the Outroute to the time when the terminals Inroute is established at the backup GW. To minimize the disruption time interval, the SFNP messages may be sent at a higher frequency (for example 40 ms) rather than the regular frequency (for example, 360 ms or Superframe time). This may reduce the time for the terminal to receive a SFNP. These messages may be different in structure and are termed as RSFNP. The RSFNP may include the GW Satellite delay for the primary and the backup GWs, GW IDs for the same. The SFNP and RSFNP messages may include a transmitting GW identifier. The terminal sees the transmitting GW ID changing upon a GW switch and begins using the delay value associated with the transmitting GW ID per timing blocks 652 and 654.

Before and sometime after, the terminal Rx 640 outroute is from the primary 642. After the terminal Rx 640 loses the outroute at 644, the terminal Rx 640 may step through the state transitions 646. The state transitions 646 may include a FLL Lock and outroute Lock where a terminal Rx 650 acquires, demodulates and decodes an outroute signal for a certain minimum number of code blocks before declaring a FLL lock. After declaring a FLL lock, the terminal Rx 640 may wait to receive 'n' messages on the outroute before declaring an outroute lock. The OSDP messages may be sent every 100 ms or at a higher frequency to decrease switching time. The state transitions 646 may include a timing initialization. After outroute lock, the terminal Rx 640 is receiving the outroute from the backup GW at 648. The received messages include RSFNP messages on the outroute. The terminal Rx 640 may use RSFNP message to set its timing correctly. As the CRO/IGM 660 is frozen, the terminal may have to stream allocations to use for transmitting association requests.

Figure 7:
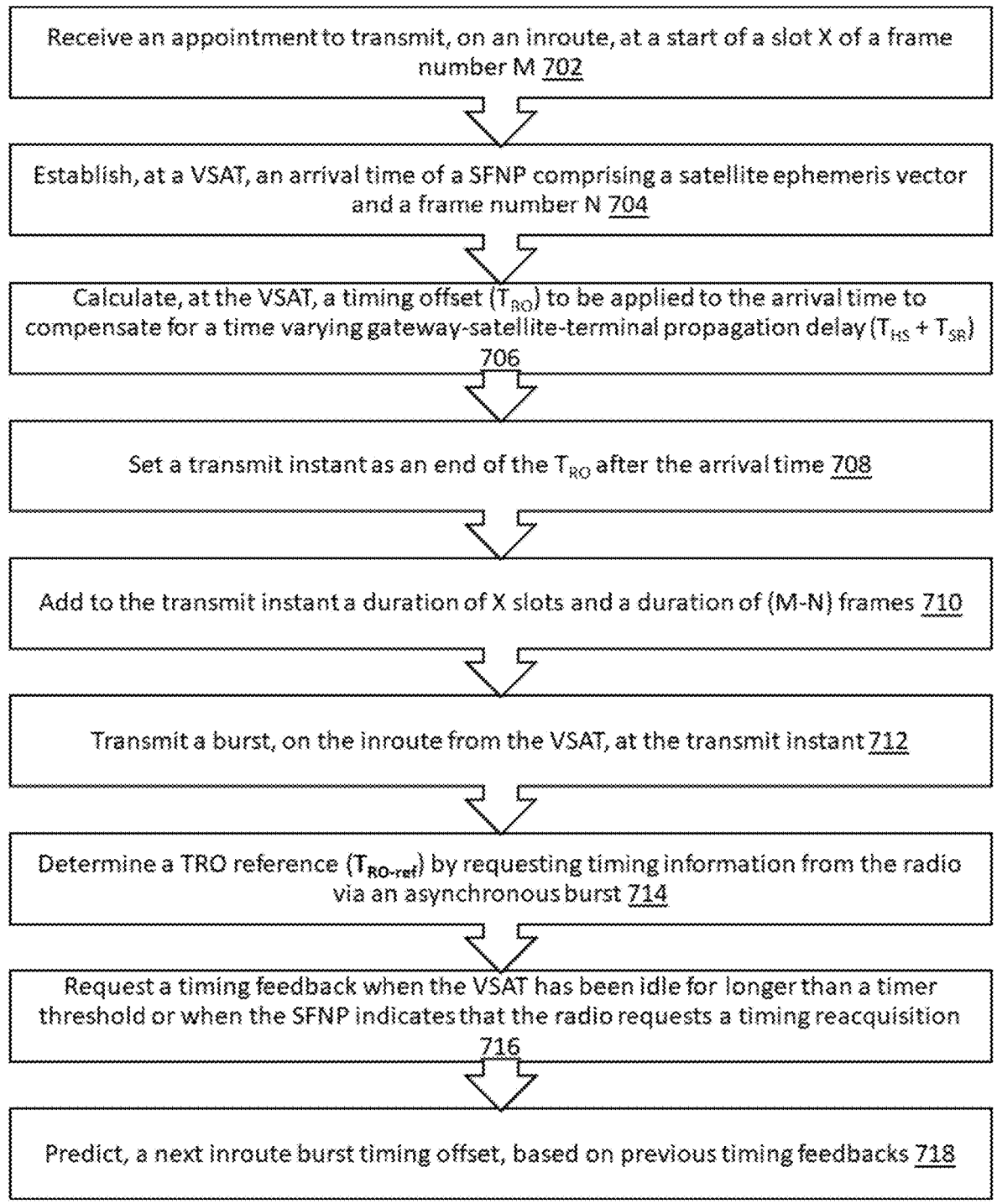
FIG. 7 illustrates a flowchart for a method for determining inroute frame timing for a VSAT according to various embodiments.

FIG. 7 illustrates a flowchart for a method for determining inroute frame timing for a VSAT according to various embodiments.

A method 700 for determining inroute frame timing for a VSAT may include an operation 702 to receive an appointment to transmit, on an inroute, at a start of a slot X of a frame number M 702. The method 700 may include an operation 704 to establish, at a VSAT, an arrival time of a SFNP comprising a satellite ephemeris vector and a frame number N. The method 700 may include an operation 706 to calculate, at the VSAT, a timing offset (TRO) to be applied to the arrival time to compensate for a time varying gateway-satellite-terminal propagation delay (THS+TSR). The method 700 may include an operation 708 to set a transmit instant as an end of the TRO after the arrival time. The method 700 may include an operation 710 to add to the transmit instant a duration of X slots and a duration of (M-N) frames. The method 700 may include an operation 712 to transmit a burst, on the inroute from the VSAT, at the transmit instant. The method 700 may include an operation 714 to determine a TRO reference (TRO-ref) by requesting timing information from the gateway via an asynchronous burst. The method 700 may include an operation 716 to request a timing feedback when the VSAT has been idle for longer than a timer threshold or when the SFNP indicates that the gateway requests a timing reacquisition. The method 700 may include an operation 718 to predict, a next inroute burst timing offset, based on previous timing feedbacks.

Figure 8:
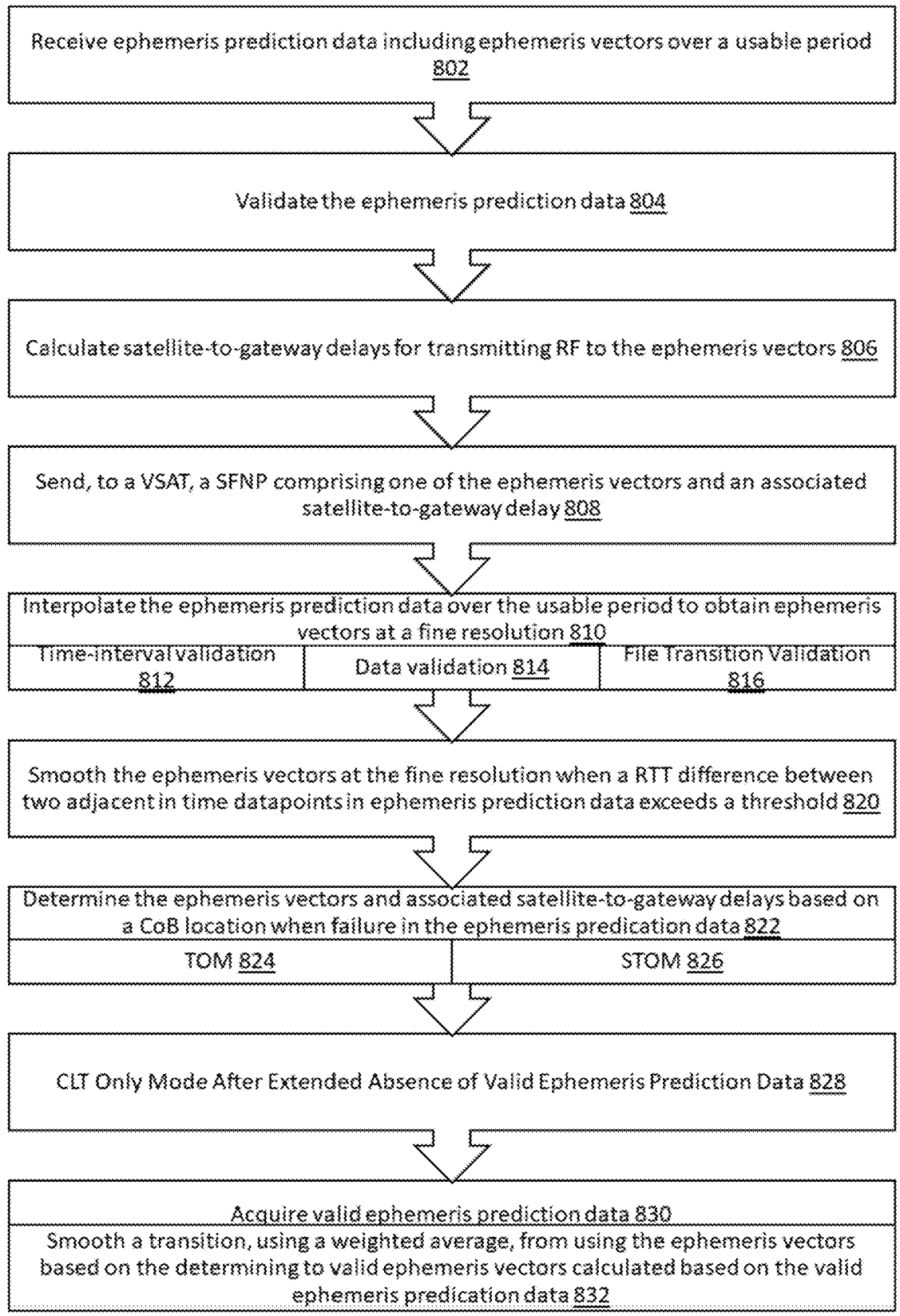
FIG. 8 illustrates a flowchart for a method for using ephemeris data for inroute timing according to various embodiments.

FIG. 8 illustrates a flowchart for a method for using ephemeris data for inroute timing according to various embodiments.

A method 800 for using ephemeris data for inroute timing may include an operation 802 to receive ephemeris prediction data including ephemeris vectors over a usable period. The method 800 may include operation 804 to validate the ephemeris prediction data. The method 800 may include operation 806 to calculate satellite-to-gateway delays for transmitting RF to the ephemeris vectors. The method 800 may include operation 808 to send, to a VSAT, a SFNP comprising one of the ephemeris vectors and an associated satellite-to-gateway delay. The method 800 may include operation 810 to interpolate the ephemeris prediction data over the usable period to obtain ephemeris vectors at a fine resolution. The operation 810 may include a time-interval validation 812, a data validation 814 and a file transition validation 816. The method 800 may include operation 820 to smooth the ephemeris vectors at the fine resolution when a RTT difference between two adjacent in time datapoints in ephemeris prediction data exceeds a threshold. The method 800 may include operation 822 to determine the ephemeris vectors and associated satellite-to-gateway delays based on a CoB location when failure in the ephemeris predication data. Operation 822 may be multimodal including a TOM 824 and a STOM 826. The method 800 may include operation 828 to perform timing synchronization in a CLT Only Mode after an extended absence of valid ephemeris prediction data. The method 800 may include operation 830 to acquire valid ephemeris prediction data. The method 800 may include operation 832 to smooth a transition, using a weighted average, from using the ephemeris vectors based on the determining to valid ephemeris vectors calculated based on the valid ephemeris predication data.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for determining inroute frame timing for a burst, the method comprising:
    receiving an appointment to transmit, on an inroute, at a start of a slot X of a frame number M;
    establishing an arrival time of a Super Frame Numbering Packet (SFNP) comprising a frame number N;
    calculating, based on a satellite ephemeris vector, a timing offset ($T_{RO}$) to be applied to the arrival time to compensate for a time varying gateway-satellite-terminal propagation delay based on a propagation time from gateway to satellite plus a propagation time from satellite to terminal ($T_{HS}+T_{SR}$);
    setting a transmit instant as an end of the $T_{RO}$ after the arrival time;
    adding to the transmit instant a duration of X slots and a duration of (M-N) frames; and
    transmitting the burst, on the inroute from the terminal, at the transmit instant,
    wherein a gateway receives the burst in the slot X within the frame number M of the inroute, and N is greater than or equal to M.

2. The method of claim 1, wherein the transmit instant has an aperture size of 15 microseconds or less.

3. The method of claim 1, further comprising determining a $T_{RO}$ reference ($T_{RO\text{-}ref}$) by requesting timing information from the gateway via an asynchronous burst, wherein the $T_{RO\text{-}ref}$ is used for the calculating.

4. The method of claim 1, further comprising determining an estimated $T_{RO}$ ($T_{RO\text{-}est}$) via a ranging ALOHA session the $T_{RO\text{-}est}$ is used for the calculating.

5. The method of claim 1, wherein the calculating updates the $T_{RO}$ based on a new satellite coordinate in a new SFNP.

6. The method of claim 1, wherein the calculating is based on a timing feedback comprising an inroute burst timing offset.

7. The method of claim 1, further comprising requesting a timing feedback when the terminal has been idle for longer than a timer threshold or when the SFNP indicates that the gateway requests a timing reacquisition.

8. The method of claim 1, wherein the satellite ephemeris vector comprises an estimated Center-of-Box vector for a satellite location.

9. The method of claim 1, further comprising predicting, a next inroute burst timing offset, based on previous timing feedbacks.

10. The method of claim 1, wherein the appointment is received by the terminal via a Bandwidth Allocation Packet.

11. A method for handling an ephemeris outage when using ephemeris data for inroute timing, the method comprising:
    transitioning to a Closed Loop Timing (CLT)-only mode when an outage duration is greater than zero;
    using an ephemeris prediction data comprising ephemeris vectors beyond a usable period for the ephemeris prediction data;
    calculating satellite-to-gateway delays for transmitting RF to the ephemeris vectors; and
    sending, to a terminal, a SFNP comprising one of the ephemeris vectors and an associated satellite-to-gateway delay.

12. The method of claim 11, wherein an outage duration is less than a temporary outage threshold, and the calculating is based on a last ephemeris vector in the ephemeris prediction data.

13. The method of claim 11, wherein an outage duration is less than a short-term outage threshold, and the calculating is based on an ephemeris series comprising a 24 hour before a start of an outage and the ephemeris series is based on the ephemeris prediction data.

14. The method of claim 11, wherein an outage duration is less than a long-term outage threshold, and the calculating is based on a straight-line satellite trajectory moving toward a Center-of-Box based on the ephemeris prediction data.

15. The method of claim 11, wherein the calculating comprises smoothing a transition, using a weighted average, from the ephemeris predication data to a previous ephemeris predication data.

16. The method of claim 11, further comprising:
    acquiring new ephemeris prediction data; and
    smoothing a transition, using a weighted average, from using the ephemeris vectors based on the calculating to valid vectors calculated based on the new ephemeris predication data.

17. A method for inroute timing acquisition by a terminal for communicating with a gateway via a satellite, the method comprising:
    transmitting a burst from the terminal to the gateway;
    receiving, at the terminal, an absolute timing of a burst arrival at the gateway;
    calculating a timing offset time (TRO) based on the absolute timing; and
    setting a transmit instant by adjusting a bandwidth allocation appointment with the TRO.

18. The method of claim 17, wherein the bandwidth allocation appointment is based on a time of arrival of a Super Frame Numbering Packet (SFNP).

19. The method of claim 17, wherein the calculating of the TRO is refined using ephemeris data.

20. The method of claim 17, wherein the calculating of the TRO is refined using a timing correction feedback.

* * * * *